(12) United States Patent
McCormack

(10) Patent No.: US 10,965,347 B2
(45) Date of Patent: Mar. 30, 2021

(54) TIGHTLY-COUPLED NEAR-FIELD COMMUNICATION-LINK CONNECTOR-REPLACEMENT CHIPS

(71) Applicant: Keyssa, Inc., Campbell, CA (US)

(72) Inventor: Gary D. McCormack, Tigard, OR (US)

(73) Assignee: Keyssa, Inc., Campbell, CA (US)

( * ) Notice: Subject to any disclaimer, the term of this patent is extended or adjusted under 35 U.S.C. 154(b) by 0 days.

(21) Appl. No.: 16/271,740

(22) Filed: Feb. 8, 2019

(65) Prior Publication Data

US 2019/0379426 A1    Dec. 12, 2019

Related U.S. Application Data

(63) Continuation of application No. 15/679,125, filed on Aug. 16, 2017, now Pat. No. 10,243,621, which is a
(Continued)

(51) Int. Cl.
| | | |
|---|---|---|
| *H04B 5/00* | (2006.01) | |
| *H04B 5/02* | (2006.01) | |
| *H04M 1/00* | (2006.01) | |

(52) U.S. Cl.
CPC ..................... *H04B 5/02* (2013.01)

(58) Field of Classification Search
None
See application file for complete search history.

(56) References Cited

U.S. PATENT DOCUMENTS

| | | |
|---|---|---|
| 2,753,551 A | 7/1956 | Richmond |
| 3,796,831 A | 3/1974 | Bauer |

(Continued)

FOREIGN PATENT DOCUMENTS

| | | |
|---|---|---|
| CN | 2237914 Y | 10/1996 |
| CN | 1178402 A | 4/1998 |

(Continued)

OTHER PUBLICATIONS

Chinese Second Office Action, Chinese Application No. 201380069854.9, dated Oct. 18, 2018, 7 pages.
(Continued)

*Primary Examiner* — Tuan A Tran
(74) *Attorney, Agent, or Firm* — Fenwick & West LLP

(57) ABSTRACT

Tightly-coupled near-field transmitter/receiver pairs are deployed such that the transmitter is disposed at a terminal portion of a first conduction path, the receiver is disposed at a terminal portion of a second conduction path, the transmitter and receiver are disposed in close proximity to each other, and the first conduction path and the second conduction path are discontiguous with respect to each other. In some embodiments of the present invention, close proximity refers to the transmitter antenna and the receiver antenna being spaced apart by a distance such that, at wavelengths of the transmitter carrier frequency, near-field coupling is obtained. In some embodiments, the transmitter and receiver are disposed on separate substrates that are moveable relative to each other. In alternative embodiments, the transmitter and receiver are disposed on the same substrate.

15 Claims, 12 Drawing Sheets

Related U.S. Application Data continuation of application No. 14/047,924, filed on Oct. 7, 2013, now Pat. No. 9,853,696, which is a continuation of application No. 12/655,041, filed on Dec. 21, 2009, now Pat. No. 8,554,136.

(60) Provisional application No. 61/203,702, filed on Dec. 23, 2008.

(56) References Cited

U.S. PATENT DOCUMENTS

| | | | |
|---|---|---|---|
| 3,971,930 A | 7/1976 | Fitzmaurice et al. |
| 3,987,365 A | 10/1976 | Okada et al. |
| 4,293,833 A | 10/1981 | Popa |
| 4,485,312 A | 11/1984 | Kusakabe et al. |
| 4,497,068 A | 1/1985 | Fischer |
| 4,525,693 A | 6/1985 | Suzuki et al. |
| 4,694,504 A | 9/1987 | Porter et al. |
| 4,771,294 A | 9/1988 | Wasilousky |
| 4,800,350 A | 1/1989 | Bridges et al. |
| 4,875,026 A | 10/1989 | Walter et al. |
| 4,946,237 A | 8/1990 | Arroyo et al. |
| 5,164,942 A | 11/1992 | Kamerman et al. |
| 5,199,086 A | 3/1993 | Johnson et al. |
| 5,426,563 A | 6/1995 | Moresco et al. |
| 5,471,668 A | 11/1995 | Soenen et al. |
| 5,543,808 A | 8/1996 | Feigenbaum et al. |
| 5,621,913 A | 4/1997 | Tuttle et al. |
| 5,749,052 A | 5/1998 | Hidem et al. |
| 5,754,948 A * | 5/1998 | Metze .................. H04B 7/00 455/41.2 |
| 5,773,878 A | 6/1998 | Lim et al. |
| 5,786,626 A | 7/1998 | Brady et al. |
| 5,861,782 A | 1/1999 | Saitoh |
| 5,898,909 A * | 4/1999 | Yoshihara ............. H01L 23/552 257/E23.114 |
| 5,921,783 A | 7/1999 | Fritsch et al. |
| 5,941,729 A | 8/1999 | Sri-Jayantha |
| 5,943,374 A | 8/1999 | Kokuryo et al. |
| 5,956,626 A | 9/1999 | Kaschke et al. |
| 6,011,785 A | 1/2000 | Carney |
| 6,072,433 A | 6/2000 | Young et al. |
| 6,252,767 B1 | 6/2001 | Carlson |
| 6,304,157 B1 | 10/2001 | Wada et al. |
| 6,351,237 B1 | 2/2002 | Martek et al. |
| 6,373,447 B1 | 4/2002 | Rostoker et al. |
| 6,490,443 B1 | 12/2002 | Freeny, Jr. |
| 6,492,973 B1 | 12/2002 | Kuroki et al. |
| 6,534,784 B2 | 3/2003 | Eliasson et al. |
| 6,542,720 B1 | 4/2003 | Tandy |
| 6,590,544 B1 | 7/2003 | Filipovic |
| 6,607,136 B1 | 8/2003 | Alsman et al. |
| 6,628,178 B2 | 9/2003 | Uchikoba |
| 6,647,246 B1 | 11/2003 | Lu |
| 6,718,163 B2 | 4/2004 | Tandy |
| 6,768,770 B1 | 7/2004 | Lipperer |
| 6,803,841 B2 | 10/2004 | Saitoh et al. |
| 6,809,899 B1 | 10/2004 | Chen et al. |
| 6,915,529 B1 | 7/2005 | Suematsu et al. |
| 6,967,347 B2 | 11/2005 | Estes et al. |
| 7,050,763 B2 | 5/2006 | Stengel et al. |
| 7,107,019 B2 | 9/2006 | Tandy |
| 7,113,087 B1 | 9/2006 | Casebolt et al. |
| 7,213,766 B2 | 5/2007 | Ryan et al. |
| 7,311,526 B2 | 12/2007 | Rohrbach et al. |
| 7,379,713 B2 * | 5/2008 | Lindstedt ................ H04B 5/02 327/564 |
| 7,509,141 B1 | 3/2009 | Koenck et al. |
| 7,512,395 B2 | 3/2009 | Beukema et al. |
| 7,517,222 B2 | 4/2009 | Rohrbach et al. |
| 7,561,875 B1 * | 7/2009 | Eberle ................ G06F 11/2294 455/41.2 |
| 7,593,708 B2 | 9/2009 | Tandy |
| 7,598,923 B2 | 10/2009 | Hardacker et al. |
| 7,599,427 B2 | 10/2009 | Bik |
| 7,612,630 B2 * | 11/2009 | Miller .................. H04B 5/0012 333/24 R |
| 7,612,674 B2 | 11/2009 | Shintani |
| 7,617,342 B2 | 11/2009 | Rofougaran |
| 7,645,143 B2 | 1/2010 | Rohrbach et al. |
| 7,656,205 B2 | 2/2010 | Chen et al. |
| 7,664,461 B2 | 2/2010 | Rofougaran et al. |
| 7,665,137 B1 | 2/2010 | Barton et al. |
| 7,667,974 B2 * | 2/2010 | Nakatani .................. H05K 1/02 361/760 |
| 7,760,045 B2 | 7/2010 | Kawasaki |
| 7,761,092 B2 | 7/2010 | Desch et al. |
| 7,768,457 B2 | 8/2010 | Pettus et al. |
| 7,769,347 B2 | 8/2010 | Louberg et al. |
| 7,778,621 B2 | 8/2010 | Tandy |
| 7,791,167 B1 | 9/2010 | Rofougaran |
| 7,820,990 B2 | 10/2010 | Schroeder et al. |
| 7,840,188 B2 * | 11/2010 | Kurokawa .......... G06F 15/7832 455/73 |
| 7,865,784 B1 | 1/2011 | White et al. |
| 7,880,677 B2 | 2/2011 | Rofougaran et al. |
| 7,881,675 B1 | 2/2011 | Gazdzinski |
| 7,881,753 B2 | 2/2011 | Rofougaran |
| 7,889,022 B2 * | 2/2011 | Miller .................... H05K 1/141 333/24 R |
| 7,907,924 B2 | 3/2011 | Kawasaki |
| 7,929,474 B2 * | 4/2011 | Pettus .................. G06F 13/409 370/310 |
| 7,975,079 B2 | 7/2011 | Bennett et al. |
| 8,013,610 B1 | 9/2011 | Merewether et al. |
| 8,014,416 B2 | 9/2011 | Ho et al. |
| 8,023,886 B2 | 9/2011 | Rofougaran |
| 8,036,629 B2 | 10/2011 | Tandy |
| 8,041,227 B2 * | 10/2011 | Holcombe ......... H04B 10/1143 398/138 |
| 8,063,769 B2 | 11/2011 | Rofougaran |
| 8,081,699 B2 | 12/2011 | Siwiak et al. |
| 8,087,939 B2 | 1/2012 | Rohrbach et al. |
| 8,121,542 B2 * | 2/2012 | Zack ........................ H04B 1/40 455/41.1 |
| 8,131,645 B2 | 3/2012 | Lin et al. |
| 8,183,935 B2 | 5/2012 | Milano et al. |
| 8,244,175 B2 | 8/2012 | Rofougaran |
| 8,244,179 B2 | 8/2012 | Dua |
| 8,279,611 B2 | 10/2012 | Wong et al. |
| 8,339,258 B2 | 12/2012 | Rofougaran |
| 8,346,847 B2 | 1/2013 | Steakley |
| 8,422,482 B2 | 4/2013 | Sugita |
| 8,554,136 B2 | 10/2013 | McCormack |
| 8,630,588 B2 | 1/2014 | Liu et al. |
| 8,634,767 B2 | 1/2014 | Rofougaran et al. |
| 8,755,849 B2 | 6/2014 | Rofougaran et al. |
| 8,794,980 B2 | 8/2014 | McCormack |
| 8,812,833 B2 | 8/2014 | Liu et al. |
| 8,811,526 B2 | 9/2014 | McCormack et al. |
| 8,939,773 B2 | 1/2015 | McCormack |
| RE45,368 E | 2/2015 | Orihashi et al. |
| 9,131,527 B2 * | 9/2015 | Mickle .................. H04W 84/02 |
| 9,374,154 B2 | 6/2016 | Kyles et al. |
| 9,553,616 B2 | 1/2017 | McCormack |
| 10,033,439 B2 | 7/2018 | McCormack et al. |
| 2002/0008665 A1 | 1/2002 | Takenoshita |
| 2002/0027481 A1 | 3/2002 | Fiedziuszko |
| 2002/0058484 A1 | 5/2002 | Bobier et al. |
| 2002/0097085 A1 | 7/2002 | Stapleton |
| 2002/0106041 A1 | 8/2002 | Chang et al. |
| 2002/0118083 A1 | 8/2002 | Pergande |
| 2002/0140584 A1 | 10/2002 | Maeda et al. |
| 2003/0025626 A1 | 2/2003 | McEwan |
| 2003/0088404 A1 | 5/2003 | Koyanagi |
| 2003/0137371 A1 | 7/2003 | Saitoh et al. |
| 2004/0043734 A1 | 3/2004 | Hashidate |
| 2004/0160294 A1 | 8/2004 | Elco |
| 2004/0193878 A1 | 9/2004 | Dillinger et al. |
| 2004/0214621 A1 | 10/2004 | Ponce De Leon et al. |
| 2005/0032474 A1 | 2/2005 | Gordon |
| 2005/0099242 A1 | 5/2005 | Sano |
| 2005/0109841 A1 | 5/2005 | Ryan et al. |
| 2005/0124307 A1 | 6/2005 | Ammar |

(56) References Cited

U.S. PATENT DOCUMENTS

| | | |
|---|---|---|
| 2005/0140436 A1 | 6/2005 | Ichitsubo et al. |
| 2005/0191966 A1 | 9/2005 | Katsuta |
| 2005/0259824 A1 | 11/2005 | Isozaki et al. |
| 2006/0003710 A1 | 1/2006 | Nakagawa et al. |
| 2006/0017157 A1 | 1/2006 | Yamamoto et al. |
| 2006/0029229 A1 | 2/2006 | Trifonov et al. |
| 2006/0038168 A1 | 2/2006 | Estes et al. |
| 2006/0051981 A1 | 3/2006 | Neidlein et al. |
| 2006/0077043 A1 | 4/2006 | Amtmann et al. |
| 2006/0082518 A1 | 4/2006 | Ram |
| 2006/0128372 A1 | 6/2006 | Gazzola |
| 2006/0140305 A1 | 6/2006 | Netsell et al. |
| 2006/0159158 A1 | 7/2006 | Moore et al. |
| 2006/0166740 A1 | 7/2006 | Sufuentes |
| 2006/0234787 A1* | 10/2006 | Lee ............... H05K 7/1412 455/575.7 |
| 2006/0258289 A1 | 11/2006 | Dua |
| 2006/0276157 A1 | 12/2006 | Chen et al. |
| 2007/0010295 A1 | 1/2007 | Greene |
| 2007/0024504 A1 | 2/2007 | Matsunaga |
| 2007/0035917 A1 | 2/2007 | Hotelling et al. |
| 2007/0063056 A1 | 3/2007 | Gaucher et al. |
| 2007/0070814 A1 | 3/2007 | Frodyma et al. |
| 2007/0108296 A1 | 5/2007 | Konopka et al. |
| 2007/0147425 A1 | 6/2007 | Lamoureux et al. |
| 2007/0229270 A1 | 10/2007 | Rofougaran |
| 2007/0242621 A1 | 10/2007 | Nandagopalan et al. |
| 2007/0273476 A1 | 11/2007 | Yamazaki et al. |
| 2007/0278632 A1 | 12/2007 | Zhao et al. |
| 2007/0285306 A1 | 12/2007 | Julian et al. |
| 2008/0001761 A1 | 1/2008 | Schwarz |
| 2008/0002652 A1 | 1/2008 | Gupta et al. |
| 2008/0055093 A1 | 3/2008 | Shkolnikov et al. |
| 2008/0055303 A1 | 3/2008 | Ikeda |
| 2008/0089667 A1 | 4/2008 | Grady et al. |
| 2008/0112101 A1 | 5/2008 | McElwee et al. |
| 2008/0142250 A1 | 6/2008 | Tang |
| 2008/0143435 A1 | 6/2008 | Wilson et al. |
| 2008/0150799 A1 | 6/2008 | Hemmi et al. |
| 2008/0150821 A1 | 6/2008 | Koch et al. |
| 2008/0159243 A1 | 7/2008 | Rofougaran |
| 2008/0165002 A1 | 7/2008 | Tsuji |
| 2008/0165065 A1 | 7/2008 | Hill et al. |
| 2008/0192726 A1 | 8/2008 | Mahesh et al. |
| 2008/0195788 A1 | 8/2008 | Tamir et al. |
| 2008/0197973 A1 | 8/2008 | Enguent |
| 2008/0211631 A1 | 9/2008 | Sakamoto |
| 2008/0238632 A1 | 10/2008 | Endo et al. |
| 2008/0289426 A1 | 11/2008 | Kearns et al. |
| 2008/0290959 A1 | 11/2008 | Ali et al. |
| 2008/0293446 A1 | 11/2008 | Rofougaran |
| 2008/0311765 A1 | 12/2008 | Chatterjee et al. |
| 2009/0006677 A1 | 1/2009 | Rofougaran |
| 2009/0009337 A1* | 1/2009 | Rofougaran ....... G06K 7/10237 340/572.7 |
| 2009/0010316 A1 | 1/2009 | Rofougaran |
| 2009/0015353 A1 | 1/2009 | Rofougaran |
| 2009/0028177 A1 | 1/2009 | Pettus et al. |
| 2009/0029659 A1 | 1/2009 | Gonzalez |
| 2009/0033455 A1 | 2/2009 | Strat et al. |
| 2009/0037628 A1 | 2/2009 | Rofougaran |
| 2009/0073070 A1 | 3/2009 | Rofougaran |
| 2009/0075688 A1 | 3/2009 | Rofougaran |
| 2009/0086844 A1 | 4/2009 | Rofougaran |
| 2009/0089459 A1 | 4/2009 | Jeyaseelan et al. |
| 2009/0091486 A1 | 4/2009 | Wiesbauer et al. |
| 2009/0094247 A1 | 4/2009 | Fredlund et al. |
| 2009/0094506 A1 | 4/2009 | Lakkis |
| 2009/0098826 A1 | 4/2009 | Zack et al. |
| 2009/0110131 A1 | 4/2009 | Bornhoft et al. |
| 2009/0111390 A1 | 4/2009 | Sutton et al. |
| 2009/0153260 A1 | 6/2009 | Rofougaran |
| 2009/0153428 A1 | 6/2009 | Rofougaran et al. |
| 2009/0175323 A1 | 7/2009 | Chung |
| 2009/0180408 A1 | 7/2009 | Graybeal et al. |
| 2009/0218407 A1 | 9/2009 | Rofougaran |
| 2009/0218701 A1 | 9/2009 | Rofougaran |
| 2009/0236701 A1 | 9/2009 | Sun et al. |
| 2009/0237317 A1* | 9/2009 | Rofougaran ........... H01Q 13/24 343/772 |
| 2009/0239392 A1 | 9/2009 | Sumitomo et al. |
| 2009/0239483 A1 | 9/2009 | Rofougaran |
| 2009/0189873 A1 | 10/2009 | Peterson et al. |
| 2009/0245808 A1 | 10/2009 | Rofougaran |
| 2009/0257445 A1 | 10/2009 | Chan et al. |
| 2009/0259865 A1 | 10/2009 | Sheynblat et al. |
| 2009/0280765 A1 | 11/2009 | Rofougaran et al. |
| 2009/0280768 A1 | 11/2009 | Rofougaran et al. |
| 2009/0282163 A1 | 11/2009 | Washiro |
| 2009/0310649 A1 | 12/2009 | Fisher et al. |
| 2010/0009627 A1 | 1/2010 | Huomo |
| 2010/0063866 A1 | 3/2010 | Kinoshita et al. |
| 2010/0071031 A1 | 3/2010 | Carter et al. |
| 2010/0103045 A1 | 4/2010 | Liu et al. |
| 2010/0120406 A1 | 5/2010 | Banga et al. |
| 2010/0127804 A1 | 5/2010 | Vouloumanos |
| 2010/0149149 A1 | 6/2010 | Lawther |
| 2010/0159829 A1 | 6/2010 | McCormack |
| 2010/0165897 A1 | 7/2010 | Sood |
| 2010/0167645 A1 | 7/2010 | Kawashimo |
| 2010/0167666 A1 | 7/2010 | Choudhury et al. |
| 2010/0202345 A1 | 8/2010 | Jing et al. |
| 2010/0202499 A1 | 8/2010 | Lee et al. |
| 2010/0203833 A1 | 8/2010 | Dorsey |
| 2010/0231452 A1* | 9/2010 | Babakhani ............. H01Q 9/065 342/368 |
| 2010/0260274 A1 | 10/2010 | Yamada et al. |
| 2010/0265648 A1 | 10/2010 | Hirabayashi |
| 2010/0277394 A1 | 11/2010 | Haustein et al. |
| 2010/0282849 A1 | 11/2010 | Mair |
| 2010/0283700 A1 | 11/2010 | Rajanish et al. |
| 2010/0285634 A1 | 11/2010 | Rofougaran |
| 2010/0289591 A1 | 11/2010 | Garcia |
| 2010/0297954 A1 | 11/2010 | Rofougaran et al. |
| 2010/0315954 A1 | 12/2010 | Singh et al. |
| 2011/0009078 A1 | 1/2011 | Kawamura |
| 2011/0012727 A1 | 1/2011 | Pance et al. |
| 2011/0038282 A1 | 2/2011 | Mihota et al. |
| 2011/0044404 A1 | 2/2011 | Vromans |
| 2011/0047588 A1 | 2/2011 | Takeuchi et al. |
| 2011/0050446 A1 | 3/2011 | Anderson et al. |
| 2011/0079650 A1 | 4/2011 | Kobayashi et al. |
| 2011/0084398 A1 | 4/2011 | Pilard et al. |
| 2011/0092212 A1 | 4/2011 | Kubota |
| 2011/0122932 A1 | 5/2011 | Lovberg |
| 2011/0127954 A1 | 6/2011 | Walley et al. |
| 2011/0143692 A1 | 6/2011 | Sofer et al. |
| 2011/0171837 A1 | 7/2011 | Hardisty et al. |
| 2011/0181484 A1 | 7/2011 | Pettus et al. |
| 2011/0197237 A1 | 8/2011 | Turner |
| 2011/0207425 A1 | 8/2011 | Juntunen et al. |
| 2011/0221582 A1 | 9/2011 | Chuey et al. |
| 2011/0249659 A1 | 10/2011 | Fontaine et al. |
| 2011/0250928 A1 | 10/2011 | Schlub et al. |
| 2011/0285606 A1 | 11/2011 | De Graauw et al. |
| 2011/0286703 A1 | 11/2011 | Kishima et al. |
| 2011/0292972 A1 | 12/2011 | Budianu et al. |
| 2011/0311231 A1 | 12/2011 | Ridgway et al. |
| 2012/0009880 A1 | 1/2012 | Trainin et al. |
| 2012/0013499 A1 | 1/2012 | Hayata |
| 2012/0028582 A1 | 2/2012 | Tandy |
| 2012/0064664 A1 | 3/2012 | Yamazaki et al. |
| 2012/0069772 A1 | 3/2012 | Byrne et al. |
| 2012/0072620 A1 | 3/2012 | Jeong et al. |
| 2012/0082194 A1 | 4/2012 | Tam et al. |
| 2012/0083137 A1 | 4/2012 | Rohrbach et al. |
| 2012/0091799 A1 | 4/2012 | Rofougaran et al. |
| 2012/0110635 A1 | 5/2012 | Harvey et al. |
| 2012/0126794 A1 | 5/2012 | Jensen et al. |
| 2012/0139768 A1 | 6/2012 | Loeda et al. |
| 2012/0219039 A1 | 8/2012 | Feher |
| 2012/0249366 A1 | 10/2012 | Pozgay et al. |
| 2012/0263244 A1 | 10/2012 | Kyles et al. |
| 2012/0265596 A1 | 10/2012 | Mazed et al. |

(56) References Cited

U.S. PATENT DOCUMENTS

| | | | |
|---|---|---|---|
| 2012/0286049 | A1 | 11/2012 | McCormack et al. |
| 2012/0290760 | A1 | 11/2012 | McCormack et al. |
| 2012/0295539 | A1 | 11/2012 | McCormack et al. |
| 2012/0307932 | A1 | 12/2012 | McCormack et al. |
| 2012/0319496 | A1 | 12/2012 | McCormack et al. |
| 2012/0319890 | A1 | 12/2012 | McCormack et al. |
| 2013/0070817 | A1 | 3/2013 | McCormack et al. |
| 2013/0106673 | A1 | 5/2013 | McCormack et al. |
| 2013/0109303 | A1 | 5/2013 | McCormack et al. |
| 2013/0148517 | A1 | 6/2013 | Abraham et al. |
| 2013/0157477 | A1 | 6/2013 | McCormack |
| 2013/0183903 | A1 | 7/2013 | McCormack et al. |
| 2013/0196598 | A1 | 8/2013 | McCormack et al. |
| 2013/0223251 | A1 | 8/2013 | Li et al. |
| 2013/0257670 | A1 | 10/2013 | Sovero et al. |
| 2013/0278360 | A1 | 10/2013 | Kim et al. |
| 2013/0286960 | A1 | 10/2013 | Li et al. |
| 2013/0316653 | A1 | 11/2013 | Kyles et al. |
| 2014/0038521 | A1 | 2/2014 | McCormack |
| 2014/0043208 | A1 | 2/2014 | McCormack et al. |
| 2014/0056286 | A1 | 2/2014 | Nagata |
| 2014/0094207 | A1 | 4/2014 | Amizur et al. |
| 2014/0148193 | A1 | 5/2014 | Kogan et al. |
| 2014/0162681 | A1 | 6/2014 | Noonan et al. |
| 2014/0253295 | A1 | 9/2014 | Roberts et al. |
| 2014/0266331 | A1 | 9/2014 | Arora |
| 2014/0269414 | A1 | 9/2014 | Hyde et al. |
| 2015/0111496 | A1 | 4/2015 | McCormack et al. |

FOREIGN PATENT DOCUMENTS

| | | | |
|---|---|---|---|
| CN | 1195908 A | | 10/1998 |
| CN | 2313296 Y | | 4/1999 |
| CN | 1257321 A | | 6/2000 |
| CN | 1282450 A | | 1/2001 |
| CN | 1359582 A | | 7/2002 |
| CN | 1371537 A | | 9/2002 |
| CN | 1389988 A | | 1/2003 |
| CN | 1620171 A | | 5/2005 |
| CN | 1665151 A | | 9/2005 |
| CN | 1695275 A | | 11/2005 |
| CN | 1781255 A | | 5/2006 |
| CN | 1812254 A | | 8/2006 |
| CN | 101090179 A | | 12/2007 |
| CN | 101496298 A | | 7/2009 |
| CN | 101681186 A | | 3/2010 |
| CN | 101785124 A | | 7/2010 |
| CN | 201562854 U | | 8/2010 |
| CN | 101908903 A | | 12/2010 |
| CN | 102024290 A | | 4/2011 |
| CN | 102156510 A | | 8/2011 |
| CN | 102187714 A | | 9/2011 |
| CN | 102308528 A | | 1/2012 |
| CN | 102333127 A | | 1/2012 |
| CN | 102395987 A | | 3/2012 |
| CN | 102420640 A | | 4/2012 |
| CN | 104937956 A | | 9/2015 |
| EP | 0152246 A2 | | 8/1985 |
| EP | 0 515 187 A2 | | 11/1992 |
| EP | 0789421 A2 | | 8/1997 |
| EP | 0884799 A2 | | 12/1998 |
| EP | 0896380 A2 | | 2/1999 |
| EP | 0996189 A2 | | 4/2000 |
| EP | 1041666 A1 | | 10/2000 |
| EP | 1 298 809 A2 | | 4/2003 |
| EP | 1357395 A1 | | 10/2003 |
| EP | 1798867 A2 | | 6/2007 |
| EP | 2106192 A2 | | 9/2009 |
| EP | 2 309 608 A1 | | 4/2011 |
| EP | 2328226 A1 | | 6/2011 |
| EP | 2 360 923 A1 | | 8/2011 |
| GB | 817349 | | 7/1959 |
| GB | 2217114 | | 10/1989 |
| JP | 52-72502 A | | 6/1977 |
| JP | 5-236031 A | | 9/1993 |
| JP | 5-327788 A | | 12/1993 |
| JP | 07-006817 A | | 1/1995 |
| JP | 9-83538 A | | 3/1997 |
| JP | 10-13296 A | | 1/1998 |
| JP | H10-065568 A | | 3/1998 |
| JP | H11-298343 A | | 10/1999 |
| JP | 2000-022665 A | | 1/2000 |
| JP | 2001-153963 A | | 6/2001 |
| JP | 2001-326506 A | | 11/2001 |
| JP | 2002-185476 A | | 6/2002 |
| JP | 2002-203730 A | | 7/2002 |
| JP | 2002-261514 A | | 9/2002 |
| JP | 2002-265729 A | | 9/2002 |
| JP | 2003-209511 A | | 7/2003 |
| JP | 2004-505505 A | | 2/2004 |
| JP | 2005-117153 A | | 4/2005 |
| JP | 2008-022247 A | | 1/2008 |
| JP | 2008-079241 | | 4/2008 |
| JP | 2008-124917 A | | 5/2008 |
| JP | 2008-129919 A | | 6/2008 |
| JP | 2008-250713 A | | 10/2008 |
| JP | 2008 252566 A | | 10/2008 |
| JP | 2009-231114 | | 7/2009 |
| JP | 2009-239842 A | | 10/2009 |
| JP | 2010-509834 A | | 3/2010 |
| JP | 2010-183055 A | | 8/2010 |
| JP | 2010-531035 A | | 9/2010 |
| JP | 2011-022640 A | | 2/2011 |
| JP | 2011-41078 A | | 2/2011 |
| JP | 2011-044944 A | | 3/2011 |
| JP | 2011-176672 A | | 9/2011 |
| JP | 2011-244179 A | | 12/2011 |
| JP | 2014-516221 | | 7/2014 |
| TW | 493369 | | 7/2002 |
| TW | 200520434 A | | 6/2005 |
| TW | 200810444 A | | 2/2008 |
| TW | 200828839 A | | 7/2008 |
| TW | 200906011 A | | 2/2009 |
| TW | 201249293 A1 | | 12/2012 |
| WO | WO 97/32413 | | 9/1997 |
| WO | WO 2006/133108 A2 | | 12/2006 |
| WO | WO 2009/113373 A1 | | 9/2009 |
| WO | WO 2011/114737 A1 | | 9/2011 |
| WO | WO 2011/114738 A1 | | 9/2011 |
| WO | WO 2012/129426 A3 | | 9/2012 |
| WO | WO 2012/154550 A1 | | 11/2012 |
| WO | WO 2012/155135 A3 | | 11/2012 |
| WO | WO 2012/166922 A1 | | 12/2012 |
| WO | WO 2012/174350 A1 | | 12/2012 |
| WO | WO 2013/006641 A3 | | 1/2013 |
| WO | WO 2013/040396 A1 | | 3/2013 |
| WO | WO 2013/059801 A1 | | 4/2013 |
| WO | WO 2013/059802 A1 | | 4/2013 |
| WO | WO 2013/090625 A1 | | 6/2013 |
| WO | WO 2013/130486 A1 | | 9/2013 |
| WO | WO 2013/131095 A1 | | 9/2013 |
| WO | WO 2013/134444 A1 | | 9/2013 |
| WO | WO 2014/026191 A1 | | 2/2014 |

OTHER PUBLICATIONS

European Patent Office, Communication pursuant to Article 94(3) EPC, EP Patent Application No. 12714432.7, dated Apr. 10, 2019, six pages.
Korean Office Action, Korean Application No. 10-2014-7016323, dated Nov. 20, 2018, 19 pages.
United States Office Action, U.S. Appl. No. 15/862,904, dated Jan. 25, 2019, 10 pages.
United States Office Action, U.S. Appl. No. 15/862,904, dated Aug. 8, 2019, 10 pages.
United States Office Action, U.S. Appl. No. 15/862,904, dated Oct. 29, 2019, 6 pages.
Akin, D., "802.111 Authentication and Key Management (AKM) White Paper," The CWNP® Program, May 2005, 10 pages, May be retrieved at<URL:https://www.cwnp.com/uploads/802-11i_key_management.pdf>.
Bluetooth Audio Dongle Receiver 3.5mm Stereo, Feb. 8, 2013.

(56) References Cited

OTHER PUBLICATIONS

Bluetooth Headset, Jabra clipper, Jul. 28, 2010.
Chinese Fifth Office Action, Chinese Application No. 201280025060.8, dated Apr. 9, 2018, 4 pages (with concise explanation of relevance).
Chinese First Office Action, Chinese Application 201280043190.4, dated Jan. 21, 2015, 18 pages.
Chinese First Office Action, Chinese Application No. 201280038180.1, dated Dec. 1, 2015, 16 pages.
Chinese First Office Action, Chinese Application No. 201280062118.6, dated Jan. 5, 2016, 15 pages.
Chinese First Office Action, Chinese Application No. 201380023102.9, dated Jun. 14, 2016, 13 pages (with concise explanation of relevance).
Chinese First Office Action, Chinese Application No. 201380048407.5, dated Feb. 3, 2016, 14 pages.
Chinese First Office Action, Chinese Application No. 201380055859.6, dated Jan. 20, 2016, 5 pages.
Chinese First Office Action, Chinese Application No. 201380069854.9, dated Nov. 29, 2017, 7 pages (with concise explanation of relevance).
Chinese First Office Action, Chinese Application No. 201380071296.X, dated Sep. 2, 2016, 24 pages (with concise explanation of relevance).
Chinese First Office Action, Chinese Application No. 201380076188.1, dated Mar. 30, 2018, 10 pages (with concise explanation of relevance).
Chinese First Office Action, Chinese Application No. 201480024681.3, dated Nov. 4, 2016, 10 pages.
Chinese First Office Action, Chinese Application No. 201610696638.2, dated Mar. 27, 2018, 9 pages.
Chinese First Office Action, Chinese Application No. 201710631303.7, dated Sep. 19, 2018, 9 pages (with concise explanation of relevance).
Chinese Fourth Office Action, Chinese Application No. 201280025060.8, dated Jun. 17, 2016, 9 pages.
Chinese Fourth Office Action, Chinese Application No. 2013800484075, dated Dec. 22, 2017, 6 pages.
Chinese Fourth Office Action, Chinese Application No. 201380071296.X, dated Apr. 16, 2018, 4 pages (with concise explanation of relevance).
Chinese Office Action, Chinese Application No. 201280025060.8, dated Oct. 30, 2014, 8 pages (with concise explanation of relevance).
Chinese Rejection Decision, Chinese Application No. 201280025060.8, dated Feb. 14, 2017, 11 pages.
Chinese Second Office Action, Chinese Application No. 201280043190.4, dated Oct. 26, 2015, 5 pages.
Chinese Second Office Action, Chinese Application No. 201280025060.8, dated Jun. 11, 2015, 8 pages.
Chinese Second Office Action, Chinese Application No. 201280038180.1, dated Aug. 18, 2016, 9 pages (with concise explanation of relevance).
Chinese Second Office Action, Chinese Application No. 201280062118.6, dated Sep. 6, 2016, 4 pages (with concise explanation of relevance).
Chinese Second Office Action, Chinese Application No. 201380023102.9, dated Mar. 1, 2017, 6 pages.
Chinese Second Office Action, Chinese Application No. 201380048407.5, dated Nov. 22, 2016, 11 pages (with concise explanation of relevance).
Chinese Second Office Action, Chinese Application No. 201380071296.X, dated May 4, 2017, 20 pages.
Chinese Third Office Action, Chinese Application No. 201280025060.8, dated Dec. 28, 2015, 6 pages.
Chinese Third Office Action, Chinese Application No. 201280038180.1, dated Dec. 2, 2016, 9 pages (with concise explanation of relevance).
Chinese Third Office Action, Chinese Application No. 201280062118.6, dated Mar. 17, 2017, 6 pages.
Chinese Third Office Action, Chinese Application No. 201380048407.5, dated Jun. 27, 2017, 6 pages.
Chinese Third Office Action, Chinese Application No. 201380071296.X, dated Nov. 6, 2017, 6 pages.
ECMA Standard: "Standard ECMA-398: Close Proximity Electric Induction Wireless Communications," Jun. 1, 2011, pp. 1-100, May be retrieved from the Internet<URL:http://www.ecma-international.org/publications/standards/Ecma-398.htm>.
Enumeration: How the Host Learns about Devices, Jan Axelson's Lakeview Research.
European Communication About Intention to Grant a European Patent Including Search Results, European Application No. 14726242, dated Nov. 30, 2016, 9 pages.
European Communication Under Rule 164(2)(a) EPC, European Application No. 14726242.2, dated Jul. 11, 2016, 3 pages.
European Examination Report, European Application No. 12726996.7, dated Mar. 5, 2018, 9 pages.
European Examination Report, European Application No. 12808634.5, dated May 31, 2017, 10 pages.
European Examination Report, European Application No. 13711499.7, dated Oct. 5, 2015, 8 pages.
European Examination Report, European Application No. 13821032.3, dated Apr. 4, 2016, 3 pages.
European Examination Report, European Application No. 13821246.9, dated Jul. 24, 2018, 4 pages.
European Examination Report, European Application No. 13821246.9, dated Mar. 7, 2018, 4 pages.
European Examination Report, European Application No. 13821246.9, dated Oct. 18, 2017, 6 pages.
European Extended Search Report, European Application No. 13879021.7, dated Oct. 17, 2016, 6 pages.
Future Technology Devices Interntional Limited (FTDI) "Technical Note TN_I 13 Simplified Description of USB Device Enumeration", Doc. Ref. No. FT_000180, Version 1.0, Issue Date Oct. 28, 2009, 19 pages.
Goldstone, L. L. "MM Wave Transmission Polarizer", International Symposium Digest—Antennas & Propagation vol. 2, Jun. 1979, 5 pages.
Ingerski, J. et al., "Mobile Tactile Communications, the Role of the UHF Follow-On Satellite Constellation and Its Successor, Mobile User Objective System," IEEE, 2002, pp. 302-306.
Japanese Office Action, Japanese Application No. 2014/547442, dated Mar. 14, 2016, 8 pages.
Japanese Office Action, Japanese Application No. 2014-513697, dated Jan. 20, 2015, 7 pages.
Japanese Office Action, Japanese Application No. 2014-513697, dated Nov. 2, 2015, 5 pages.
Japanese Office Action, Japanese Application No. 2014-519270, dated Mar. 9, 2015, 17 pages.
Japanese Office Action, Japanese Application No. 2014-547442, dated Feb. 26, 2018, 11 pages.
Japanese Office Action, Japanese Application No. 2014-547442, dated May 25, 2015, 7 pages.
Japanese Office Action, Japanese Application No. 2014-547442, dated Oct. 24, 2016, 5 pages.
Japanese Office Action, Japanese Application No. 2015-004839, dated Aug. 10, 2015, 12 pages.
Japanese Office Action, Japanese Application No. 2015-004839, dated May 16, 2016, 10 pages.
Japanese Office Action, Japanese Patent Office, "Notice of Reasons for Rejection" in connection with related Japanese Patent Application No. 2014-501249, dated Jul. 22, 2014, 7 pages.
Juntunen, E. A , "60 GHz CMOS Pico-Joule/Bit Oook Receiver Design for Multi-Gigabit Per Second Wireless Communications" thesis paper, Aug. 2008, 52 pages.
Korean Office Action, Korean Application No. 10-2013-7027865, dated Apr. 13, 2015, 8 pages.
Korean Office Action, Korean Application No. 10-2013-7027865, dated Oct. 22, 2014, 12 pages.
Korean Office Action, Korean Application No. 10-2015-7029405, dated Jul. 19, 2016, 4 pages (with concise explanation of relevance).
Korean Office Action, Korean Application No. 10-2017-7001850, Sep. 22, 2017, 7 pages.

(56) References Cited

OTHER PUBLICATIONS

Korean Second Office Action, Korean Application No. 10-2017-7001850, dated Mar. 16, 2018, 4 pages (with concise explanation of relevance).
Li, X. et al., "Space-Time Transmissions for Wireless Secret-Key Agreement with Information-Theoretic Secrecy," IEEE, 2003, pp. 1-5.
Office of Engineering and Technology Federal Communications Commission, "Understanding the FCC Regulations for Low-Power, Non-Licensed Transmitters", OET Bulletin No. 63, Oct. 1993, 34 pages.
PCM510x 2VRMS DirectPath™, 112/106/IOOdB Audio Stereo DAC with 32-bit, 384kHz PCM Interface by Texas Instruments.
PCT International Search Report and Written Opinion, PCT Application No. PCT/US2013/033394, dated Aug. 8, 2013, 10 pages.
PCT International Search Report and Written Opinion, PCT Application No. PCT/US2013/055487, dated Jan. 24, 2014, 9 pages.
PCT International Search Report and Written Opinion, PCT Application No. PCT/US2013/059811, dated Dec. 2, 2013, 11 pages.
PCT International Search Report and Written Opinion, PCT Application No. PCT/US2013/076687, dated May 21, 2014, 20 pages.
PCT International Search Report and Written Opinion, PCT Application No. PCT/US2014/024027, dated Jul. 21, 2014, 15 pages.
PCT International Search Report and Written Opinion, PCT Application No. PCT/US2014/030115, dated Sep. 22, 2014, 15 pages.
PCT International Search Report, PCT Application No. PCT/US2013/075222, dated Jul. 17, 2014, 4 pages.
PCT International Search Report, PCT Application No. PCT/US2013/075892, dated Apr. 23, 2014, 4 pages.
PCT International Search Report, PCT Patent Application No. PCT/US2012/030166, dated Oct. 31, 2010, 6 pages.
PCT International Search Report, PCT Patent Application No. PCT/US2012/037795, dated Jan. 21, 2013, 7 pages.
PCT International Search Report, PCT Patent Application No. PCT/US2012/040214, dated Aug. 21, 2012, 3 pages.
PCT International Search Report, PCT Patent Application No. PCT/US2012/042616, dated Oct. 1, 2012, 4 pages.
PCT International Search Report, PCT Patent Application No. PCT/US2012/045444, dated Jan. 21, 2013, 7 pages.
PCT International Search Report, PCT Patent Application No. PCT/US2012/055488, dated Dec. 13, 2012, 4 pages.
PCT International Search Report, PCT Patent Application No. PCT/US2012/061345, dated Jan. 24, 2013, 4 pages.
PCT International Search Report, PCT Patent Application No. PCT/US2012/061346, dated Jan. 24, 2013, 5 pages.
PCT International Search Report, PCT Patent Application No. PCT/US2012/069576, dated May 2, 2013, 3 pages.
PCT International Search Report, PCT Patent Application No. PCT/US2013/023665, dated Jun. 20, 2013, 5 pages.
PCT International Search Report, PCT Patent Application No. PCT/US2013/027835, dated May 3, 2013, 4 pages.
PCT International Search Report, PCT Patent Application No. PCT/US2013/028896, dated Sep. 26, 2013, 4 pages.
PCT International Search Report, PCT Patent Application No. PCT/US2013/029469, dated Jun. 6, 2013, 5 pages.
PCT International Search Report, PCT Patent Application No. PCT/US2013/046631, dated Sep. 20, 2013, 4 pages.
PCT International Search Report, PCT Patent Application No. PCT/US2013/054292, dated Nov. 29, 2013, 4 pages.
PCT Written Opinion, PCT Application No. PCT/US2013/075222, dated Jul. 17, 2014, 8 pages.
PCT Written Opinion, PCT Application No. PCT/US2013/075892, dated Apr. 23, 2014, 8 pages.
PCT Written Opinion, PCT Patent Application No. PCT/US2012/055488, dated Dec. 13, 2012, 8 pages.
PCT Written Opinion, PCT Patent Application No. PCT/US2012/030166, dated Oct. 31, 2010, 9 pages.
PCT Written Opinion, PCT Patent Application No. PCT/US2012/037795, dated Jan. 21, 2013, 12 pages.
PCT Written Opinion, PCT Patent Application No. PCT/US2012/040214, dated Aug. 21, 2012, 8 pages.
PCT Written Opinion, PCT Patent Application No. PCT/US2012/042616, dated Oct. 1, 2012, 10 pages.
PCT Written Opinion, PCT Patent Application No. PCT/US2012/045444, dated Jan. 21, 2013, 9 pages.
PCT Written Opinion, PCT Patent Application No. PCT/US2012/061345, dated Jan. 24, 2013, 7 pages.
PCT Written Opinion, PCT Patent Application No. PCT/US2012/061346, dated Jan. 24, 2013, 9 pages.
PCT Written Opinion, PCT Patent Application No. PCT/US2012/069576, dated May 2, 2013, 13 pages.
PCT Written Opinion, PCT Patent Application No. PCT/US2013/023665, dated Jun. 20, 2013, 10 pages.
PCT Written Opinion, PCT Patent Application No. PCT/US2013/027835, dated May 3, 2013, 8 pages.
PCT Written Opinion, PCT Patent Application No. PCT/US2013/028896, dated Sep. 26, 2013, 4 pages.
PCT Written Opinion, PCT Patent Application No. PCT/US2013/029469, dated Jun. 6, 2013, 5 pages.
PCT Written Opinion, PCT Patent Application No. PCT/US2013/046631, dated Sep. 20, 2013, 6 pages.
PCT Written Opinion, PCT Patent Application No. PCT/US2013/054292, dated Nov. 29, 2013, 7 pages.
Philips, I2S Bus Specification, Jun. 5, 1996.
RF Power Amplifier, Mar. 22, 2008, 1 pages, May be Retrieved at <http://en.wikipedia.org/wiki/RF_power_amplifier>.
Silicon Labs USB-to-12S Audio Bridge Chip Brings Plug-and-Play Simplicity to Audio Design, Cision Wire, Feb. 4, 2013.
Taiwan Office Action, Taiwan Application No. 101110057, dated Mar. 23, 2016, 7 pages.
Taiwan Office Action, Taiwan Application No. 101119491, dated May 9, 2016, 9 pages.
Taiwan Office Action, Taiwan Application No. 101121492, dated Feb. 9, 2018, 8 pages.
Taiwan Office Action, Taiwan Application No. 101121492, dated Jul. 28, 2016, 11 pages.
Taiwan Office Action, Taiwan Application No. 101124197, dated Oct. 17, 2016, 8 pages.
Taiwan Office Action, Taiwan Application No. 101138870, dated Jun. 13, 2016, 8 pages.
Taiwan Office Action, Taiwan Application No. 101147406, dated Mar. 23, 2016, 6 pages.
Taiwan Office Action, Taiwan Application No. 102128612, dated Jan. 10, 2017, 10 pages.
Taiwan Office Action, Taiwan Application No. 105134730, dated Sep. 25, 2017, 5 pages.
Taiwan Office Action, Taiwan Application No. 105139861, dated Dec. 11, 2017, 6 pages.
Taiwan Office Action, Taiwan Application No. 105143334, dated Aug. 29, 2017, 17 pages.
TN21065L_I2S, Interfacing I2S-Compatible Audio Devices to the ADSP-21065L Serial Ports, Apr. 1999.
"Understanding the FCC Regulations for Low-Power Non-Licensed Transmitters", Office of Engineering and Technology, Federal Communications Commission, OET Bulletin No. 63, Oct. 1993.
United States Advisory Action, U.S. Appl. No. 14/936,877, dated Dec. 6, 2016, 6 pages.
United States Examiner's Answer to Appeal, U.S. Appl. No. 13/541,543, dated Oct. 7, 2016, 26 pages.
United States Office Action, U.S. Appl. No. 12/655,041, dated Jun. 7, 2013, 9 pages.
United States Office Action, U.S. Appl. No. 13/427,576, dated Oct. 30, 2014, 6 pages.
United States Office Action, U.S. Appl. No. 13/485,306, dated Sep. 26, 2013, 11 pages.
United States Office Action, U.S. Appl. No. 13/524,956, dated Feb. 9, 2015, 17 pages.
United States Office Action, U.S. Appl. No. 13/524,963, dated Mar. 17, 2014, 14 pages.
United States Office Action, U.S. Appl. No. 13/541,543, dated Dec. 21, 2015, 20 pages.

(56) References Cited

OTHER PUBLICATIONS

United States Office Action, U.S. Appl. No. 13/541,543, dated Feb. 12, 2015, 25 pages.
United States Office Action, U.S. Appl. No. 13/541,543, dated May 28, 2015, 17 pages.
United States Office Action, U.S. Appl. No. 13/541,543, dated Oct. 28, 2014, 42 pages.
United States Office Action, U.S. Appl. No. 13/657,482, dated Jan. 2, 2015, 29 pages.
United States Office Action, U.S. Appl. No. 13/657,482, dated Sep. 22, 2015, 24 pages.
United States Office Action, U.S. Appl. No. 13/760,089, dated Jul. 7, 2014, 14 pages.
United States Office Action, U.S. Appl. No. 13/784,396, dated Sep. 11, 2014, 7 pages.
United States Office Action, U.S. Appl. No. 13/922,062, dated Jul. 23, 2015, 10 pages.
United States Office Action, U.S. Appl. No. 13/963,199, dated Jul. 27, 2015, 9 pages.
United States Office Action, U.S. Appl. No. 13/963,199, dated Jun. 1, 2016, 8 pages.
United States Office Action, U.S. Appl. No. 14/026,913, dated Feb. 25, 2015, 15 pages.
United States Office Action, U.S. Appl. No. 14/026,913, dated Jun. 5, 2015, 16 pages.
United States Office Action, U.S. Appl. No. 14/026,913, dated Sep. 18, 2015, 9 pages.
United States Office Action, U.S. Appl. No. 14/047,924, dated Aug. 11, 2016, 7 pages.
United States Office Action, U.S. Appl. No. 14/047,924, dated Feb. 27, 2014, 9 pages.
United States Office Action, U.S. Appl. No. 14/047,924, dated Feb. 27, 2017, 8 pages.
United States Office Action, U.S. Appl. No. 14/047,924, dated May 21, 2015, 6 pages.
United States Office Action, U.S. Appl. No. 14/047,924, dated Nov. 18, 2015, 7 pages.
United States Office Action, U.S. Appl. No. 14/106,765, dated Dec. 11, 2018, 14 pages.
United States Office Action, U.S. Appl. No. 14/106,765, dated Dec. 22, 2016, 13 pages.
United States Office Action, U.S. Appl. No. 14/106,765, dated Jul. 7, 2017, 11 pages.
United States Office Action, U.S. Appl. No. 14/106,765, dated Jun. 9, 2016, 10 pages.
United States Office Action, U.S. Appl. No. 14/106,765, dated Mar. 9, 2018, 14 pages.
United States Office Action, U.S. Appl. No. 14/109,938, dated Aug. 14, 2015, 12 pages.
United States Office Action, U.S. Appl. No. 14/135,458, dated Apr. 13, 2015, 13 pages.
United States Office Action, U.S. Appl. No. 14/215,069, dated Oct. 30, 2015, 15 pages.
United States Office Action, U.S. Appl. No. 14/462,560, dated Feb. 13, 2015, 12 pages.
United States Office Action, U.S. Appl. No. 14/596,172, dated Feb. 10, 2015, 7 pages.
United States Office Action, U.S. Appl. No. 14/881,901, dated Dec. 17, 2015, 15 pages.
United States Office Action, U.S. Appl. No. 14/936,877, dated Mar. 23, 2016, 15 pages.
United States Office Action, U.S. Appl. No. 14/936,877, dated Oct. 4, 2016, 11 pages.
United States Office Action, U.S. Appl. No. 15/144,756, dated Jun. 16, 2016, 12 pages.
United States Office Action, U.S. Appl. No. 15/204,988, dated Aug. 31, 2016, 10 pages.
United States Office Action, U.S. Appl. No. 15/290,342, dated Jun. 6, 2016, 8 pages.
United States Office Action, U.S. Appl. No. 15/406,543, dated Oct. 30, 2017, 8 pages.
United States Office Action, U.S. Appl. No. 15/862,904, dated Jun. 26, 2018, 12 pages.
United States Office Action, U.S. Appl. No. 14/047,924, dated Dec. 19, 2014, 8 pages.
Universal Serial Bus, Wikipedia, 2012 (32 pages).
USB in a NutShell . . . (43 pages).
USB Made Simple, MQP Electronics Ltd, 2006-2008 (78 pages).
Vahle Electrification Systems, "CPS Contactless Power System", Catalog No. 9d/E, 2004, 12 pages.
Wireless HD: "WirelessHD Specification Version 1.1 Overview," May 1, 2010, pp. 1-95, May be retrieved from the Internet<URL:http://www.wirelesshd.org/pdfs/WirelessHD-Specification-Overview-v1.1May2010.pdf>.
United States Office Action, U.S. Appl. No. 15/679,125, dated Jan. 12, 2018, seven pages.

\* cited by examiner

TIGHTLY-COUPLED NEAR-FIELD COMMUNICATION-LINK CONNECTOR-REPLACEMENT CHIPS

CROSS-REFERENCE TO RELATED APPLICATIONS

This application is a continuation of U.S. patent application Ser. No. 15/679,125, filed Aug. 16, 2017, which is a continuation of U.S. patent application Ser. No. 14/047,924, filed Oct. 7, 2013, which is a continuation of U.S. patent application Ser. No. 12/655,041, filed Dec. 21, 2009 and entitled "Tightly-Coupled Near-Filed Communication-Link Connector-Replacement Chips", which application claims the benefit of U.S. Provisional Patent Application Ser. No. 61/203,702, filed Dec. 23, 2008 and entitled "Tightly-Coupled near-Field Radio Connector-Replacement Chips", which are all incorporated herein by reference in their entirety for all purposes.

FIELD OF THE INVENTION

The present invention relates generally to signal communication paths in electronic systems, and relates more particularly to methods and apparatus for coupling signals between physically discontinuous conduction paths through near-field communication link circuits.

BACKGROUND

Advances in semiconductor manufacturing and circuit design technologies have enabled the development and production of integrated circuits with increasingly higher operational frequencies. In turn, electronic products and systems incorporating such integrated circuits are able to provide much greater functionality than previous generations of products. This additional functionality has generally included the processing of larger and larger amounts of data at higher and higher speeds.

Many electronic systems include two or more printed circuit boards, or similar substrates, upon which the aforementioned high-speed integrated circuits are mounted, and on and through which various signals are routed to and from these integrated circuits. In electronic systems with at least two boards, and the need to communicate information between those boards, a variety of connector and backplane architectures have been developed in order that information can flow between those boards.

Unfortunately, such connector and backplane architectures introduce a variety of impedance discontinuities into the signal path which result in a degradation of signal quality, also referred to as signal integrity. Connecting two boards by conventional means, such as signal-carrying mechanical connectors generally creates two, closely-spaced discontinuities, and this complex discontinuity requires expensive electronics to negotiate.

Degradation of signal integrity limits the ability of electronic systems to transfer data at very high rates which in turn limits the utility of such products.

What is needed are methods and apparatus for coupling discontiguous portions of very high data rate signal paths without the cost and power consumption associated with physical connectors and equalization circuits.

SUMMARY OF THE INVENTION

Briefly, tightly-coupled near-field transmitter/receiver pairs are deployed such that the transmitter is disposed at a terminal portion of a first conduction path, the receiver is disposed at a terminal portion of a second conduction path, the transmitter and receiver are disposed in close proximity to each other, and the first conduction path and the second conduction path are discontiguous with respect to each other.

In some embodiments of the present invention, close proximity refers to the transmitter antenna and the receiver antenna being spaced apart by a distance such that, at wavelength s of the transmitter carrier frequency, near-field coupling is obtained.

In some embodiments, the transmitter and receiver are disposed on separate substrates, or carriers, that are positioned relative to each other such that, in operation, the antennas of the transmitter/receiver pair are separated by a distance such that, at wavelengths of the transmitter carrier frequency, near-field coupling is obtained.

DETAILED DESCRIPTION

Generally, embodiments of the present invention provide methods and apparatus for transferring data through a physically discontiguous signal conduction path without the physical size and signal degradation introduced by a signal-carrying mechanical connector, and without the associated costs and power consumption of equalization circuits. Various embodiments of the present invention provide data transfer between physically discontiguous portions of a signal conduction path by means of near-field coupling apparatus which have tightly-linked transmitter and receiver pairs. These transmitters and receivers are typically implemented as integrated circuits Antennas for these may be internal or external with respect to the integrated circuits.

In some embodiments of the present invention, the transmitter/receiver pair includes a first chip with a transmitter and a second chip with a receiver; while in other embodiments the transmitter/receiver pair includes a first chip with one or more transceivers, and a second chip with one or more transceivers.

In some embodiments, the signal conduction path is single-ended, whereas in other embodiments the signal conduction path includes a differential pair.

Figure 14:
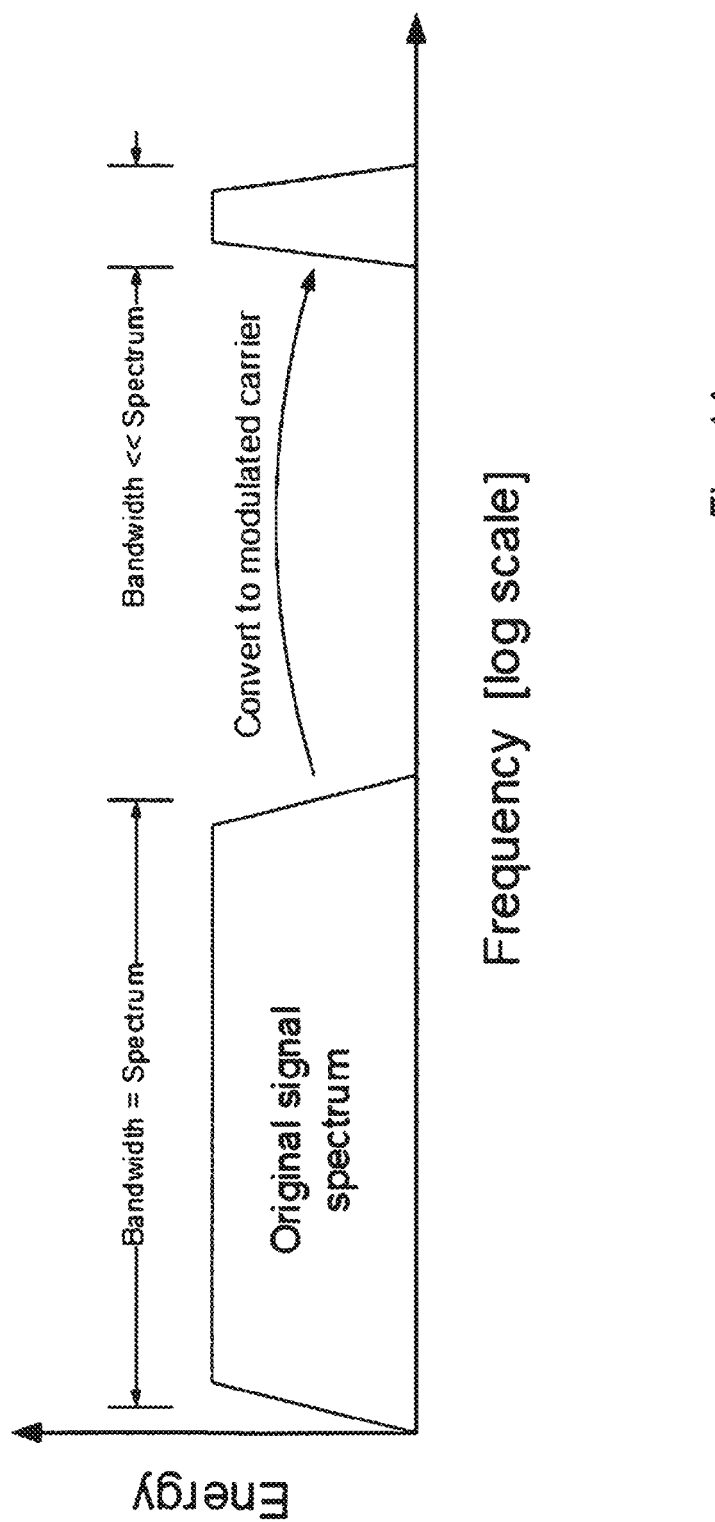
FIG. 14 is a diagram illustrating the relationship between bandwidth and spectrum before and after converting the information to a modulated carrier at a higher frequency.

Conventional electronic connectors have an irregular frequency response that degrades signal integrity. Various embodiments of the present invention use a modulated carrier to confer immunity to impediments in the frequency response of such connectors. In effect, the broadband nature of an original signal is converted to a narrowband signal shifted up to the carrier rate (see FIG. 14). It is noted that using a modulated carrier to transmit the original signal is still compatible with the original electronic connector, presuming the connector is capable of passing the narrow-band carrier.

Since embodiments of the present invention use a modulated carrier to transport the original signal, it is desirable to use a very high frequency carrier (EHF for example, which is 30 GHz to 300 GHz) to allow very high data rates to be supported. As a consequence of using an EHF carrier, transmission methods similar to radio are practical, and the higher that the carrier frequency is, the smaller the physical dimensions of embodiments of the invention can be. Most physical connectors are sized from between a few millimeters to a few centimeters, which roughly correspond to the wavelengths of EHF. Working within the footprint of a given physical connector, it is possible to create coupling structures, or antennas, in accordance with the present invention, to eliminate the need for wires to physically contact each other.

It is noted that the short wavelength of EHF signals (1 mm to 1 cm) allows tight coupling between each end of a near-field communication-link in accordance with the present invention. In turn, this allows multiple near-field communication-link connector-replacement chips to be closely spaced to each other while maintaining adequate channel separation.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following description, numerous specific details are set forth in order to provide a thorough understanding of the present invention. It will be apparent to those skilled in the art that the present invention may be practiced without these specific details. In other instances, well-known steps or components are not described in detail in order to not obscure the present invention. Furthermore, it is understood that the various embodiments shown in the figures are illustrative representations and are not necessarily drawn to scale.

Terminology

Near-field communication link refers to an arrangement between a transmitting and a receiving antenna, where the distance between the respective antennas is roughly less than $2D^2/\text{lambda}$ where D is the largest dimension of the source of the radiation, and lambda is the wavelength.

The acronym EHF stands for Extremely High Frequency, and refers to a portion of the electromagnetic spectrum in the range of 30 GHz to 300 GHz.

As used herein, the term transceiver refers to an integrated circuit including a transmitter and a receiver so that that integrated circuit may be used to both transmit and receive information. In various implementations a transceiver is operable in a half-duplex mode, a full-duplex mode, or both.

The expression connector-replacement chips refer to embodiments of the present invention that fit within a form factor that would otherwise be required to be occupied by a mechanical connector.

The terms, chip, die, integrated circuit, semiconductor device, and microelectronic device, are often used interchangeably in this field. The present invention is applicable to all the above as they are generally understood in the field.

With respect to chips, various signals may be coupled between them and other circuit elements via physical, electrically conductive connections. Such a point of connection is maybe referred to as an input, output, input/output (I/O), terminal, line, pin, pad, port, interface, or similar variants and combinations.

Figure 1:
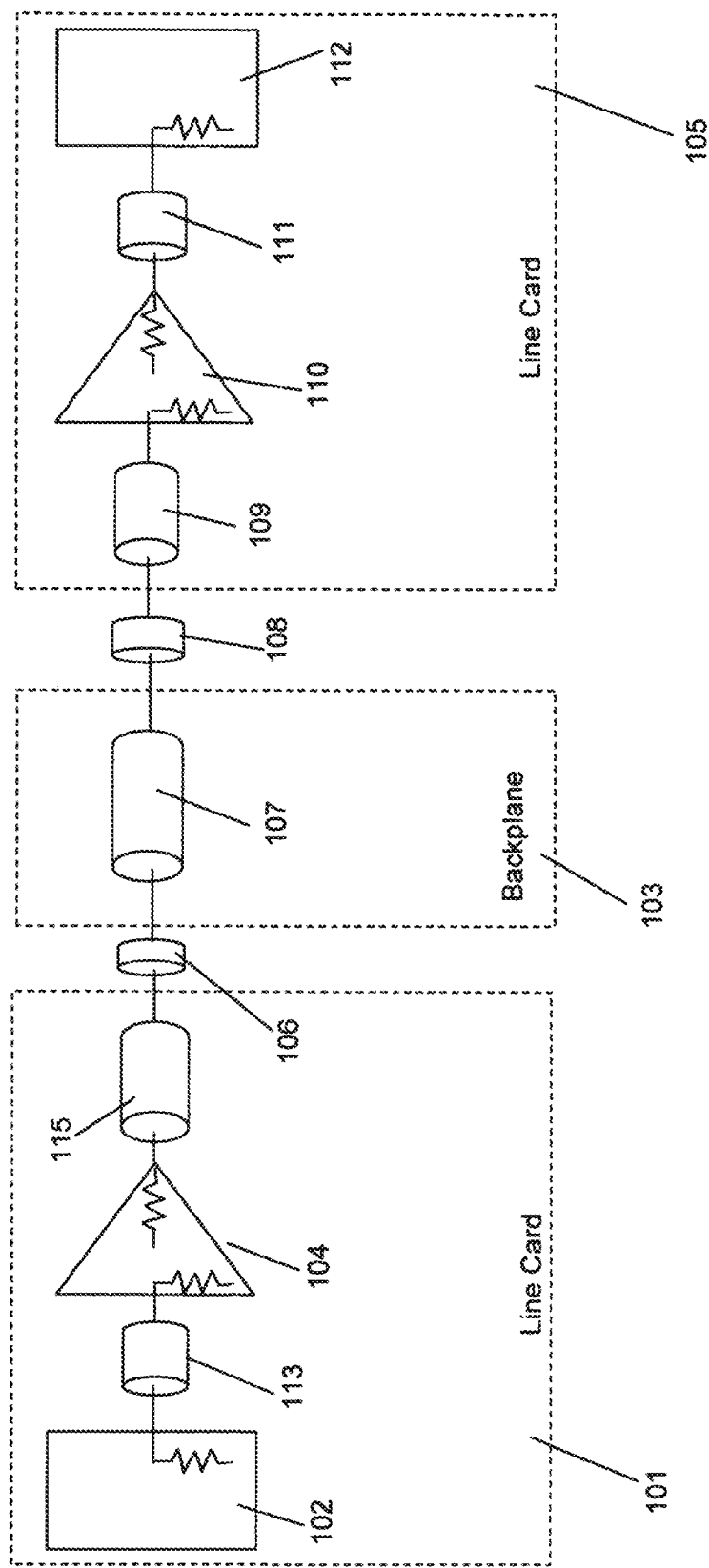
FIG. 1 is a high-level schematic representation of a signal path between two integrated circuits, each of the two integrated circuits disposed on a different board, and wherein the signal path includes backplane transceivers, a backplane, and a pair of physical connectors carrying the signals to and from the backplane.

To obtain the full benefit of the very high speed integrated circuits incorporated into electronic systems now and in the future, it is important to be able to communicate large amounts of information at high speed between boards and/or over backplanes, Data rates of 10 Gbps or greater are needed for upgrading the performance and capacity of various electronic systems. FIG. 1 illustrates a signal path between two integrated circuits that includes discontiguous wire segments, backplane transceivers, and connectors. More particularly, FIG. 1 shows a first line card 101 having a first integrated circuit 102 and a first backplane transceiver 104 (the output driving function is represented), with a conductive path 113 disposed between first integrated circuit 102 and first backplane transceiver 104, and another conductive path 115 disposed between first backplane transceiver 104 and an edge of first line card 101. A first signal-carrying mechanical connector 106 couples the output signal path of first backplane transceiver 104 from first line card 101 to a conductive path 107 disposed on a backplane 103. A signal-carrying mechanical connector 108 couples the conductive path 107 of backplane 103 to a corresponding conductive path 109 on a second line card 105, this corresponding conductive path 109 being connected to a second backplane transceiver 110 (the receiver function is represented). The output of second backplane transceiver 110 is coupled to a second integrated circuit 112 via a conductive path 111 disposed therebetween.

Unfortunately, conventionally used physical means of coupling discontiguous conduction paths between boards, either directly between boards, or between boards with a backplane disposed therebetween, introduce signal degrading discontinuities. Impedance discontinuities are created by physical transitions in the signal path. Those skilled in this field will appreciate that discontinuities may degrade signal integrity more than wire length. Backplane signal paths may commonly include a plurality of discontinuities.

Figure 2:
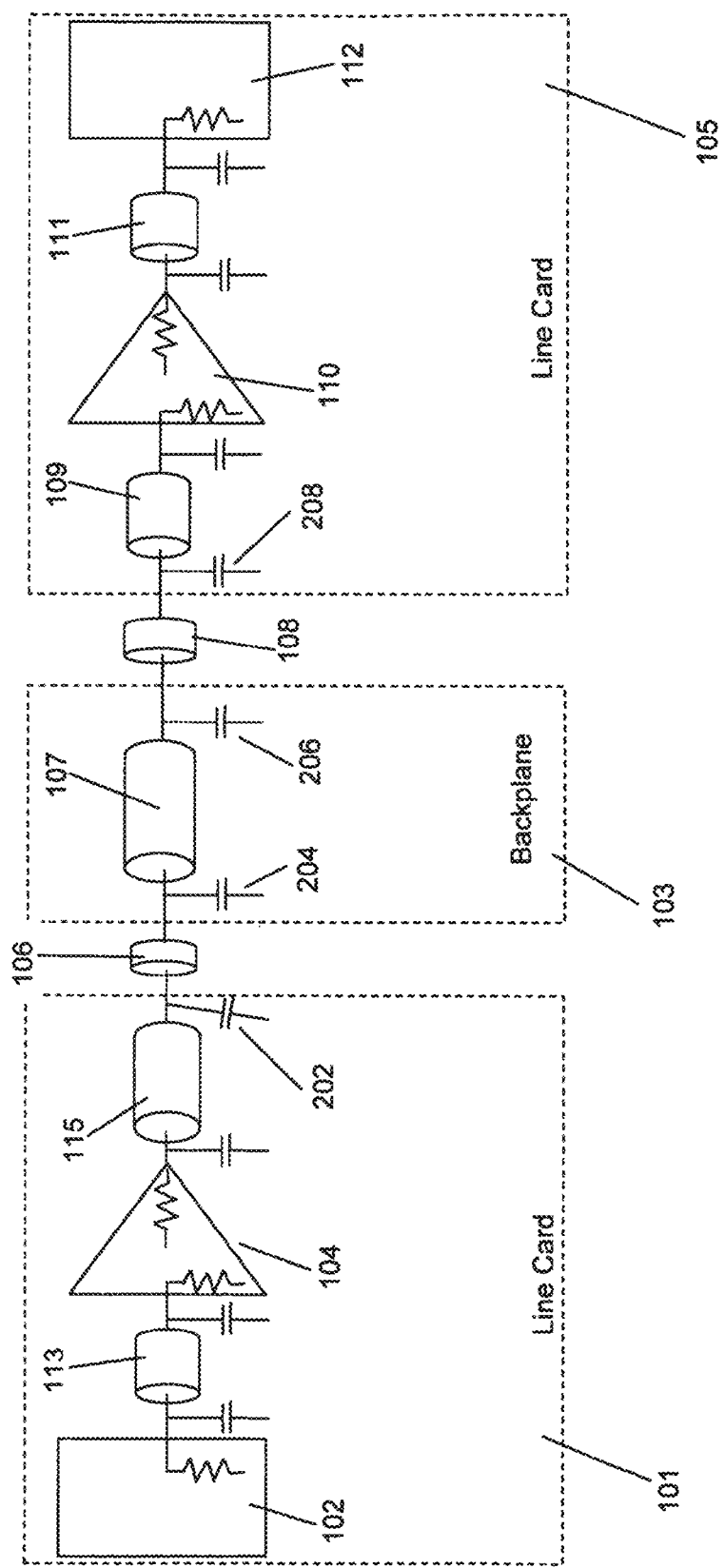
FIG. 2 is a high-level schematic representation similar to FIG. 1, but shows various discontinuities in the signal path.

Referring to FIG. 2, capacitive discontinuities, which may be created by vias between a buried stripline and a surface-mount component, are illustrated. Backplane connectors, such as signal-carrying mechanical connectors 106, 108, may also introduce discontinuities. Some discontinuities may be tolerable in a design if they are disposed within a certain distance of a termination. Typically, discontinuities that are paired in close proximity, and/or spaced away from a termination are problematic with regard to signal integrity. FIG. 2 generally illustrates the transitions that lead to discontinuities, and in particular shows locations of capacitive discontinuities 202, 204 and 206, 208 which result from transitions located away from proper terminations. These transitions are caused by the use of signal-carrying mechanical connectors.

Conventional attempts to overcome these signal degrading discontinuities have included the introduction of complex backplane transceivers. Unfortunately, such backplane transceivers add both cost and power consumption to the electronic products into which they are incorporated. In those instances where many physical transitions occur between the chips that need to communicate with each other, the engineering cost to develop, implement, and deploy backplane transceivers suitable for a particular application may also be very costly.

Figure 3:
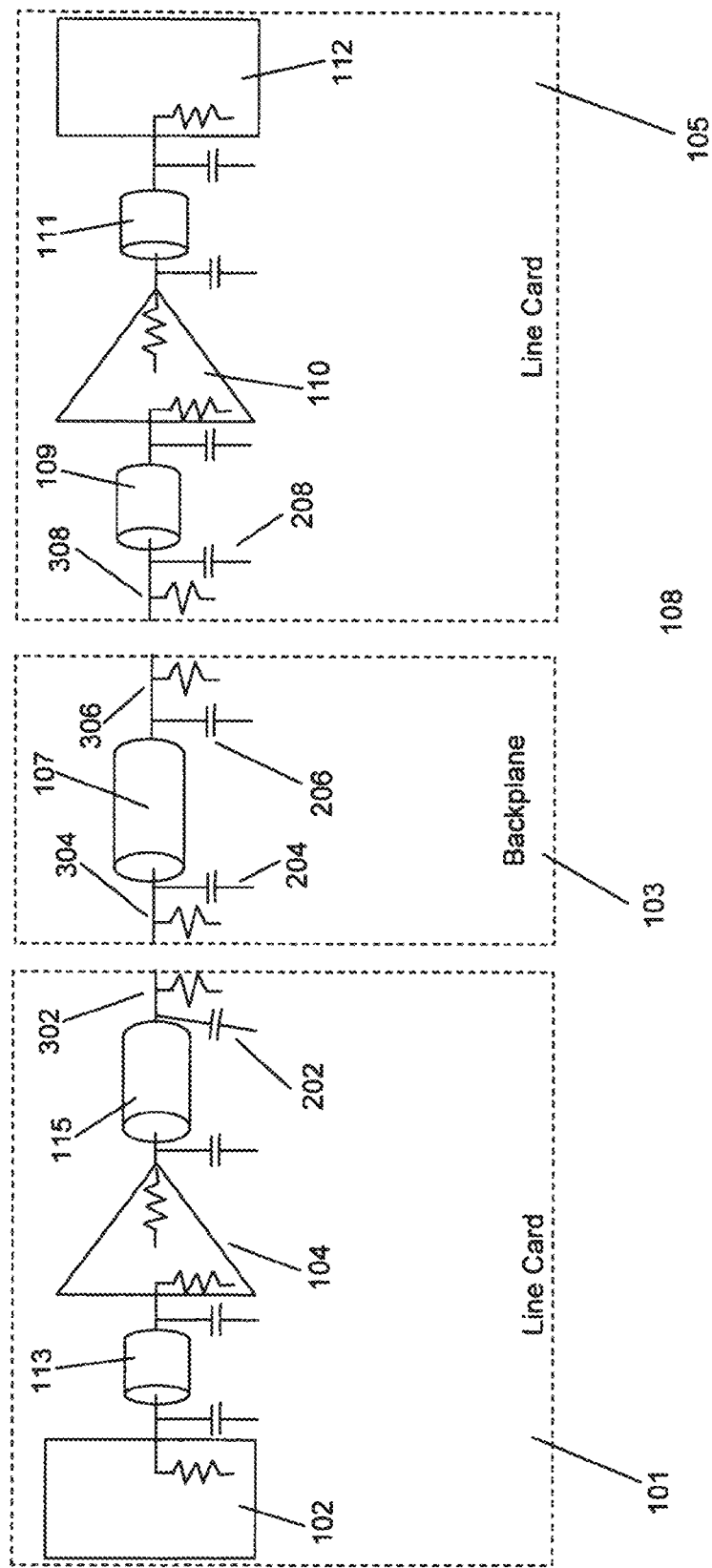
FIG. 3 is a high-level schematic representation of some of the components of a signal path between two integrated circuits, each of the two integrated circuits disposed on a different board, and further shows discontinuities and terminations to reduce or eliminate the loss of signal integrity that would otherwise result.

Recognizing that two closely-spaced discontinuities are bad for signal integrity, one approach to improving signal integrity is to provide termination, for example the resistors 302, 304, 306, 308, at the edges of line card 101, backplane 103, and line card 105 as shown in FIG. 3, and then regenerate the signal on major discontinuities. However, terminating and then regenerating the signal across a physical connector is a problem due to the physical constraints of the mechanical system that houses the electronic connection between the respective conduction paths.

Various embodiments of the present invention overcome the problem of terminating and then regenerating the signal across a physical connector by providing a method to eliminate the direct physical contact between the respective conduction paths using a near-field communication-link signal propagation path to couple the signal of interest between boards and/or between a board and a backplane. Recent developments in semiconductor processing and device architecture allow integrated circuits to operate at frequencies needed to implement a near-field transceiver on a CMOS chip.

Figure 4:
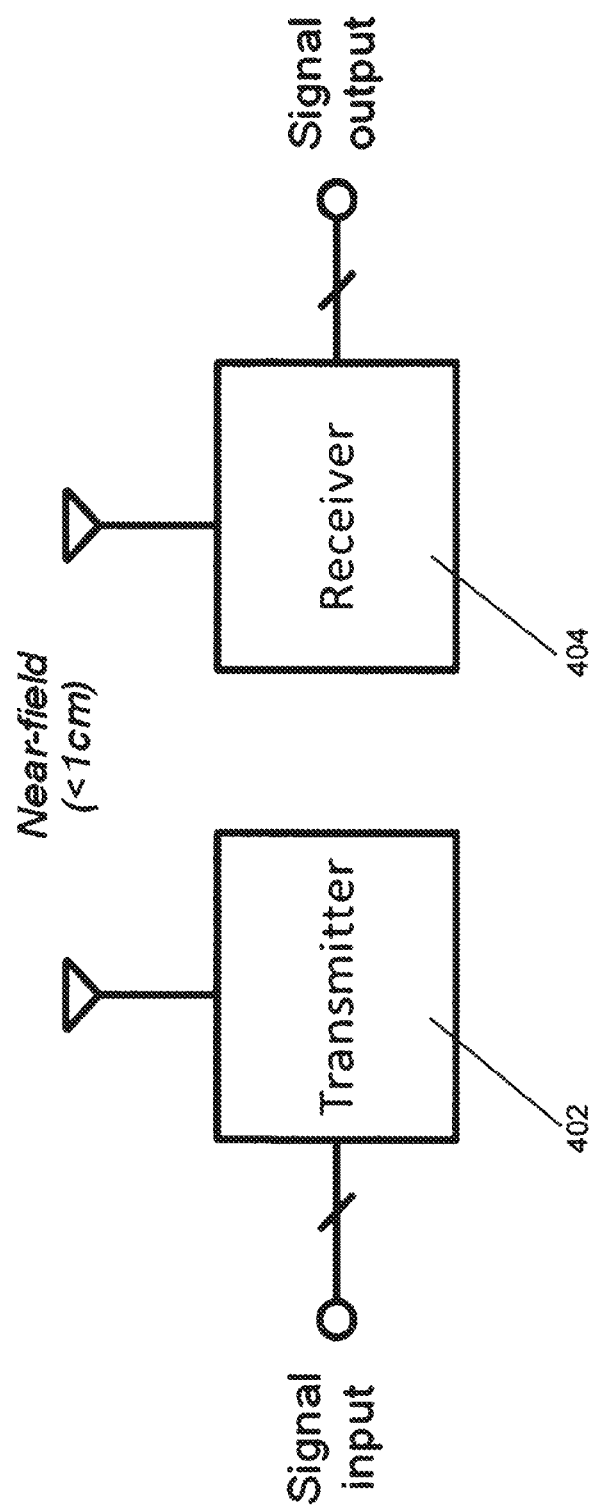
FIG. 4 is a block diagram of a near-field transmitter/receiver pair, and indicating a separation of less than one centimeter.

FIG. 4 provides a high-level schematic representation of a near-field transmitter/receiver pair. In the illustrative embodiment of FIG. 4, transmitter 402 and receiver 404 are not physically touching, but are spaced in proximity to each other such that near-field coupling between them is obtained. In accordance with the present invention, the near-field transmitter/receiver pair provides an ultra-miniaturized high-capacity communications link. An EHF carrier enables tiny antennas and very large bandwidth capacity. Additionally, signal equalization and termination management may be integrated on the same chip with the near-field transmitter, receiver, and/or transceiver.

Figure 5:
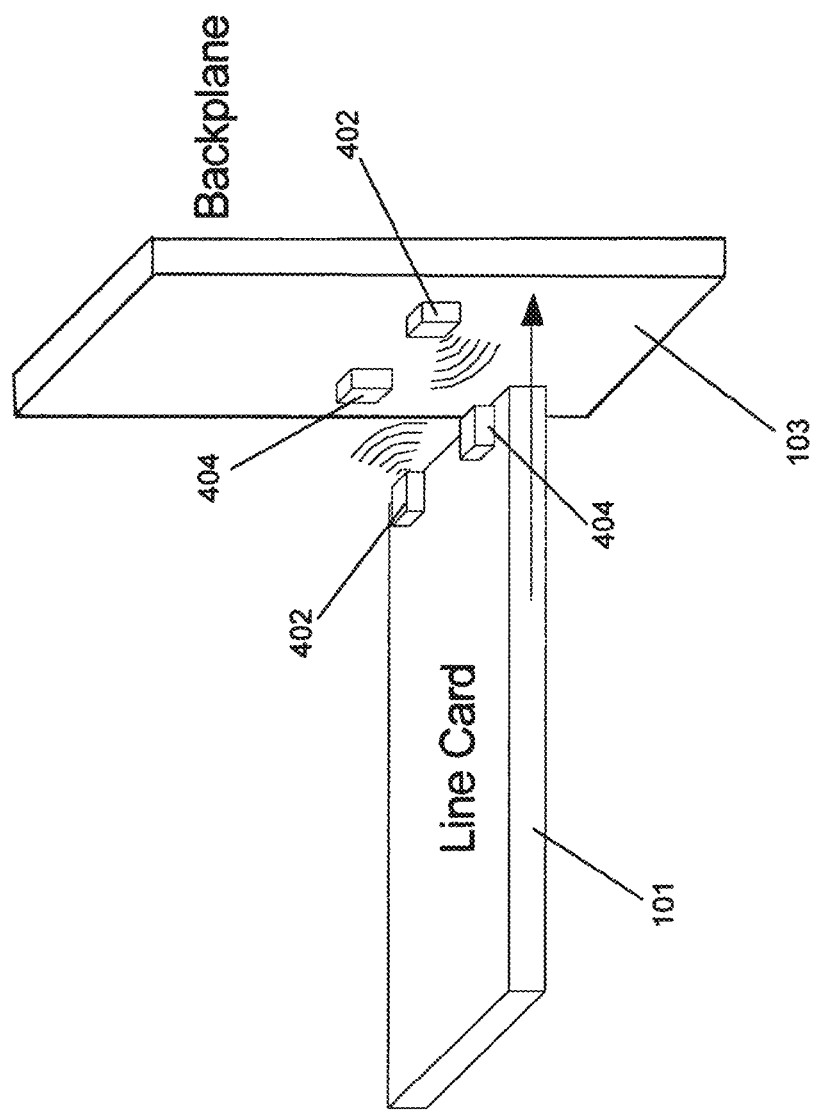
FIG. 5 is a high-level representation of a line card and a backplane wherein signal paths are provided between physically separate wire segments through the use of tightly linked near-field signal transmission/reception.

FIG. 5 provides a high-level representation of apportion of an electronic system including line card 101 and backplane 103 wherein signal paths are provided between physically separate wire segments through the use of tightly-linked near-field signal coupling rather than signal-carrying mechanical connectors. The near-field transceivers (transmitter section 402, receiver section 404) are disposed in the areas of the boards that conventionally would have been occupied by signal-carrying mechanical connectors. No changes are required to the overall mechanical structure of the system. In the illustrative embodiment of FIG. 5, it can be seen that the transmit and receive chips become adjacent once the card is inserted, i.e., the line card and the backplane are brought into close proximity. Actual contact is not required between either the line card and backplane, or between the transmit and receive chips, It is noted that the coupling field is sufficient to allow 0° and 90° orientations. In the illustrative embodiment of FIG. 5, chops 402, 404 on line card 101 are shown disposed such that one edge of each of them is adjacent an edge of line card 101. Similarly, chips 404, 402 on backplane 103 are shown disposed such that they reside inwardly from each edge of backplane 103. It will be appreciate that, in accordance with the present invention, no particular location on a substrate is required for these chips other than that when the substrates are brought into the desired range of alignment, the near-field transmitter/receiver pairs will achieve near-field coupling.

Figure 6:
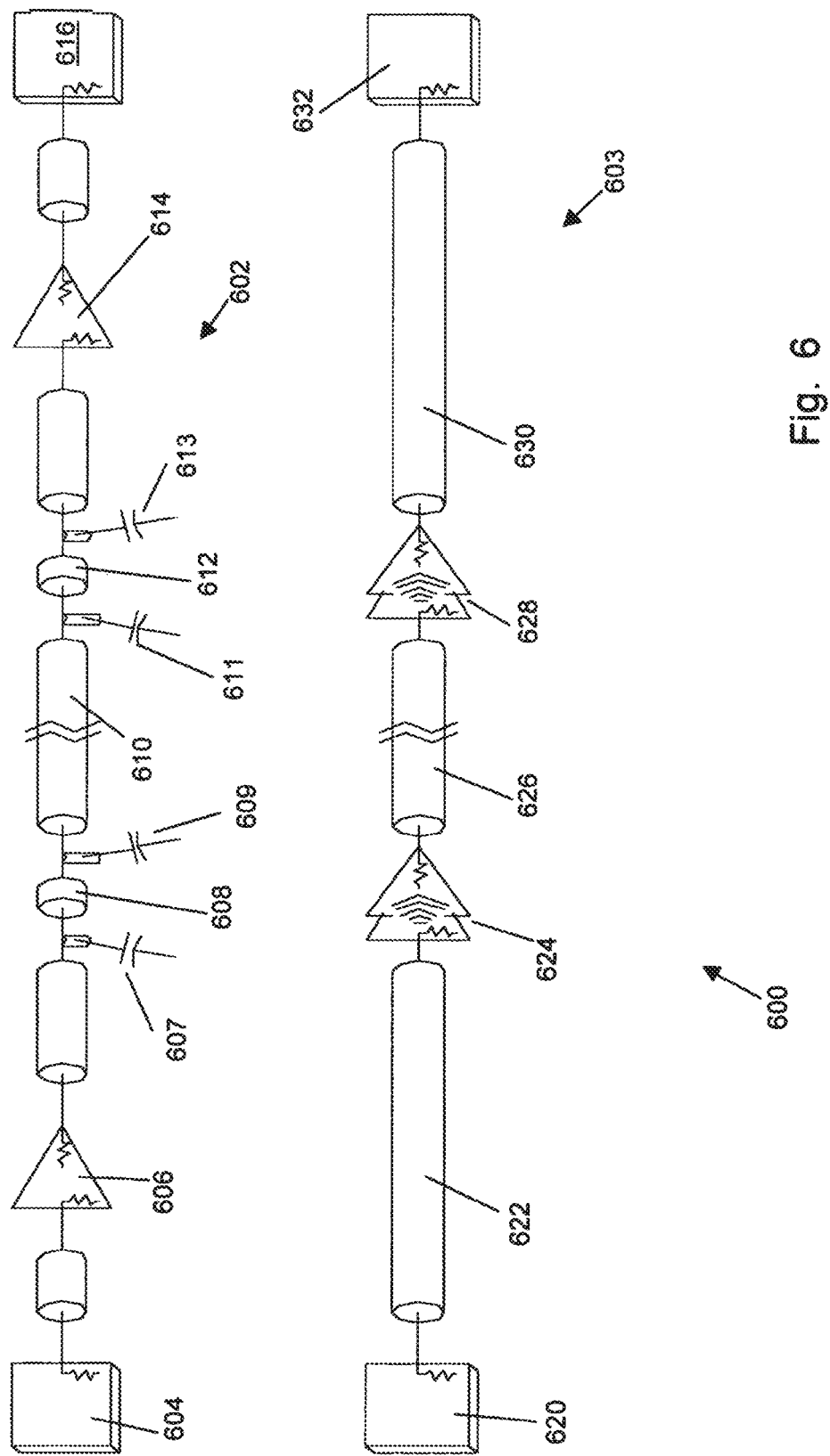
FIG. 6 is a high-level representation of two signal paths, the first signal path including a first chip coupled to a first backplane transceiver, with is coupled to a first signal-carrying mechanical connector, which is coupled to a backplane, which is coupled to a second signal-carrying mechanical connector, which is coupled to a second backplane transceiver, which is coupled to a second chip; and the second signal path, in accordance with the present invention, including a first chip coupled to the backplane by means of a first near-field transmitter/receiver pair, and the backplane coupled to a second chip by means of a second near-field transmitter/receiver pair.

FIG. 6 is a high-level schematic representation of two signal paths 602, 603 in a system 600, a first signal path 602, in accordance with conventional design practices, including a first chip 604 coupled to a first backplane transceiver 606, which is coupled to a first signal-carrying mechanical connector 608, which is couple to a backplane 610, which is coupled to a second signal-carrying mechanical connector 612, which is coupled to a second backplane transceiver 614, which is coupled to a second chip 616; and a second signal path 603, in accordance with the present invention, including a first chip 620 coupled to a backplane 626 by means of a first near-field transmitter/receiver pair 624, and backplane 626 coupled to a second chip 632 by means of a second near-field transmitter/receiver pair 628. Conventional signal path 602 further includes discontinuities 607 and 609 associated with connector 608, and discontinuities 611 and 613 associated with connector 612.

The arrangement of signal path 603, in accordance with the present invention, provides improved performance and reliability as compared to conventional signal path 602. The presence of signal-carrying mechanical connectors and the associated signal path discontinuities in conventional signal path 602 introduce signal integrity problems as data rates increase (e.g., above 2 Gb/s). It can be seen, that signal path 603, in accordance with the present invention, eliminates signal-carrying mechanical connectors 608, 612 and backplane transceivers 606, 614 of conventional signal path 602. The use of near-field transmitter/receiver pairs 624, 628 eliminates the signal-carrying mechanical connectors. It can also be seen that the discontinuities associated with connectors 608, 612, and thus the data rate limitations imposed by degradation of signal integrity, are advantageously absent from signal path 603. Additionally, elimination of signal-carrying mechanical connectors from the signal path provides greater reliability in mechanically harsh environments. Further, some or all of the circuitry found in the backplane transceivers 606, 614 may be eliminated in embodiments of the present invention because such circuitry was used to overcome the loss of signal integrity caused by the signal-carrying mechanical connectors.

Figure 8:
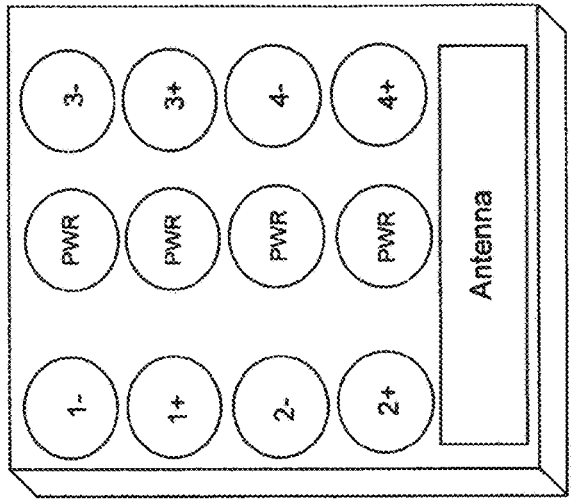
FIG. 8 is a bottom view representation of an illustrative near-field communication-link connector-replacement chip in accordance with the present invention showing power terminals, signal terminals, and antenna placement.
Figure 7:
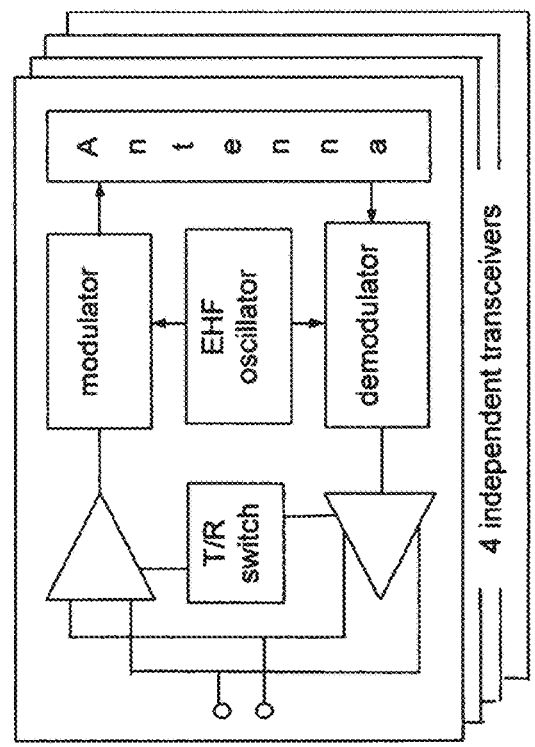
FIG. 7 is a block diagram of an illustrative near-field communication-link connector-replacement chip in accordance with the present invention showing the major functional blocks of a transceiver.
Figure 9:
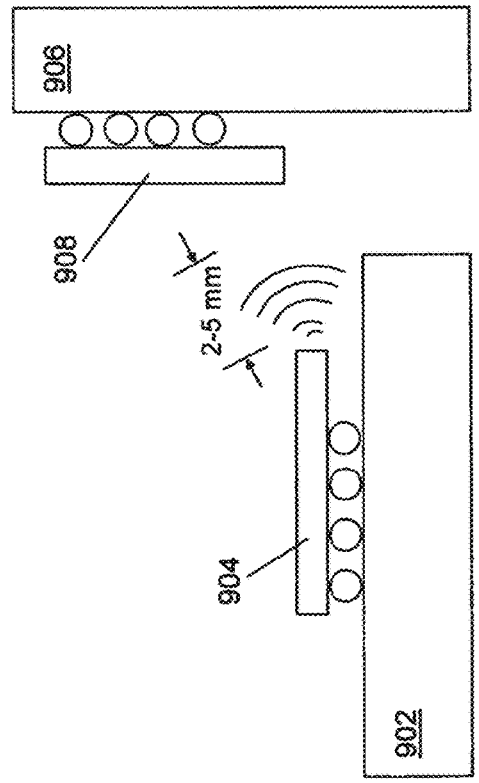
FIG. 9 is an enlarged side view of a portion of a pair of boards disposed perpendicularly to each other and further showing a near-field transmitter/receiver pair positioned within a 2 to 5 millimeter range of each other.

FIGS. 7-9 show some of the details of the near-field transmitter/receiver pairs of the present invention. More particular, FIG. 7 shows a block diagram of an illustrative near-field transceiver connector-replacement chip in accordance with the present invention illustrating the major functional blocks of a transceiver, including an antenna, an EHF oscillator, a modulator, a demodulator, a transmit/receive switch and amplifiers for the transmit and receive pathways. In this embodiment, four independent transceivers are incorporated into a single chip. It is noted that additional circuitry any be incorporated into such near-field transceiver connector-replacement chips so as to implement other functions desired for any particular implementation, such as aggregation of lower rate signals into a single high-rate carrier. FIG. 8 shows a bottom view of an illustrative near-field communication-link connector-replacement chip in packaged form, in accordance with the present invention, showing power terminals, signal terminals, and antenna placement. Those skilled in the art and having the benefit of the present disclosure will appreciate that other arrangements of signal and power terminals are possible within the scope of the present invention. FIG. 9 shows an enlarged side view of a portion of a pair of boards 902, 906 disposed perpendicularly to each other and further showing a near-field transmitter/receiver pair comprised of a pair of near-field transceiver connector-replacement chips 904, 908, positioned within a 2 to 5 millimeter range of each other. In this illustrative embodiment, one board is a line card and the other is a backplane. Any suitable means of disposing the line card and the backplane, such that the near-field transmitter/receiver pair is positioned to operate in a tightly coupled manner, may be used. In one example, a card cage, or rack, are used to slide the line card into an aligned position with the backplane.

Still referring to FIG. 9, various features and benefits of the tightly-coupled near-field transceiver connector-replacement chips can be seen. For example, mechanical registration requirements are relaxed with embodiments of the present invention, thus providing substantially looser manufacturing tolerances, leading in turn to lower cost and substantially vibration-proof connections. As compared to conventional signal-carrying mechanical connectors, where a few microns of separation will open the connection, embodiments of the present invention can be positioned plus or minus a few millimeters and still work. Zero insertion force is required as between a line card and a backplane because no mechanical contact is required between the two, either directly or by way of a mechanical connector. Since there is no contact, as is required with conventional approaches, there is no wear and tear, and thus essentially infinite cycling leading again to lower costs. Embodiments of the present invention are compatible with known manufacturing procedures, and actually eliminate a generally complicated and expensive connector assembly step. Additionally, since signal equalization circuitry may be incorporated with the near-field transmitters, receivers, and/or transceivers of the present invention, the system costs for peripheral silicon dedicated to backplane signal equalization can be reduced.

Figure 10:
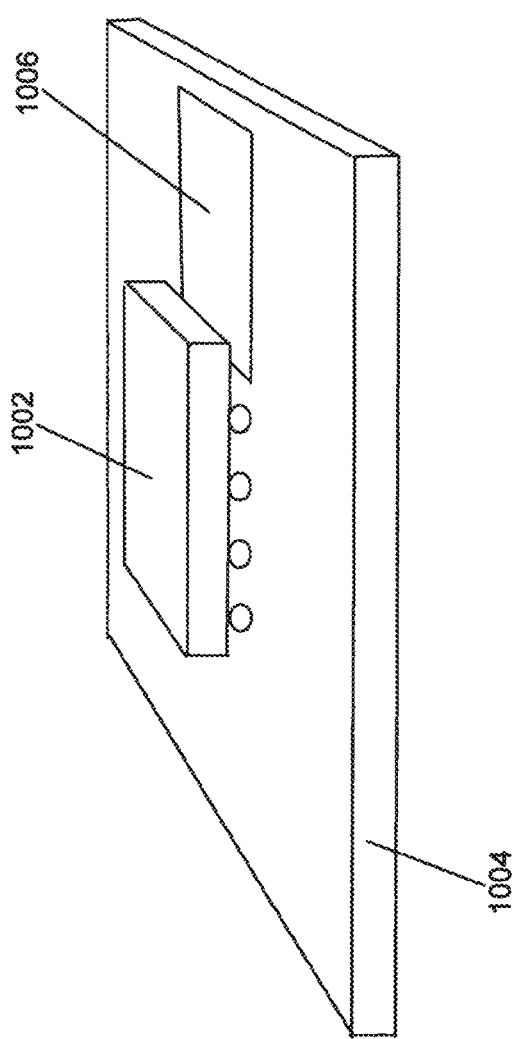
FIG. 10 illustrates a near-field transceiver chip mounted to a substrate with an antenna disposed on the substrate adjacent to the chip.

FIG. 10 shows a portion of an illustrative embodiment of the present invention that includes a near-field transceiver chip 1002 mounted to a substrate 1004 with a coupling element 1006 (hereinafter referred to as an "antenna") disposed on substrate 1004 adjacent to near-field transceiver chip 1002. It is noted that coupling element, or antenna, 1006 may have different shapes in different embodiments. In typical embodiments, an edge portion of the integrated circuit die on which the transceiver is formed is reserved for the antenna interface. In some embodiments, an antenna is disposed on the die, while in other embodiments the antenna is disposed external to the die. In embodiments with an external antenna, the antenna may be directly or indirectly coupled to the circuitry of the die. Those skilled in the art, and having the benefit of this disclosure, will appreciate that the shape of the coupling element on the substrate may vary within the scope of the present invention.

Figure 11:
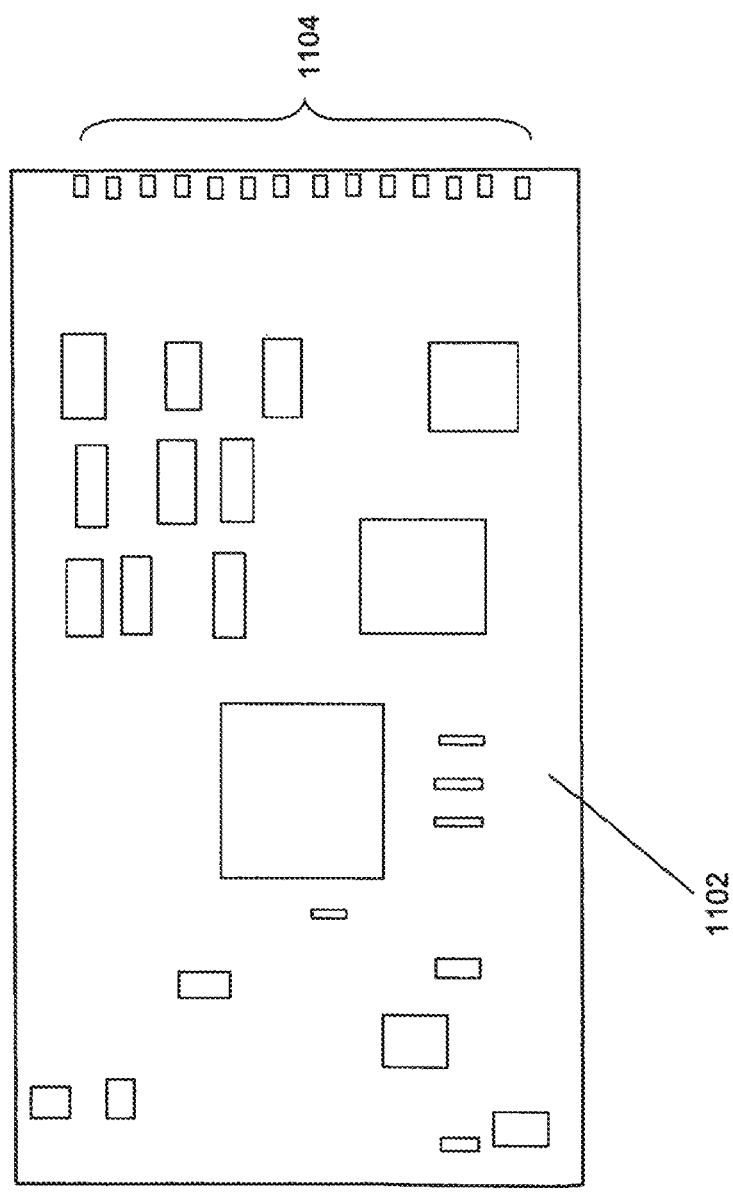
FIG. 11 is a top view of a printed circuit board with a plurality of near-field transceivers disposed along one edge of the board.

FIG. 11 shows a printed circuit board 1102 with a plurality of near-field transceiver chips 1104 disposed along one edge of board 1102, and various other active and passive components commonly found on printed circuit boards but not relevant to the present invention. In this illustrative embodiment, near-field transceiver chips 1104 are disposed about 1 to 2 millimeters from the board edge, and have a separation from each other suitable to prevent crosstalk between themselves. It is noted that this arrangement occupies the same or less volume than an edge connector.

The near-field transmitter/receiver and method of the present invention provide advantages not found in conventional radio systems. In this near-field region, signal strength can be used to aid in selectivity, and large improvement in signal to noise ratios is possible. Near-field attenuation can be used to associate by proximity, so near-field transceiver chips in accordance with the present invention can re-use frequencies every few wavelengths of separation. In other words, even if multiple near-field transmitters in accordance with the present invention are disposed on the same or adjacent substrates, as long as these near-field transmitters are spaced apart by several wavelengths of the transmitter signal, then the frequency of the transmitter signals can be the same without interfering with each other.

Figure 12:
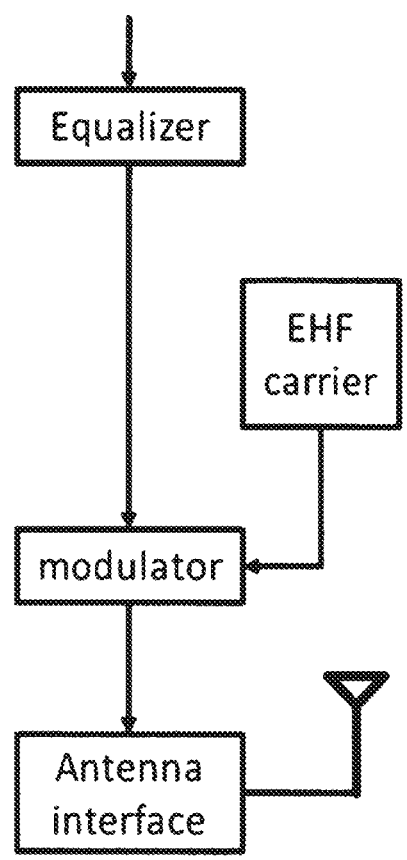
FIG. 12 is a high-level block diagram of the transmit path of a near-field transmitter in accordance with the present invention.

FIG. 12 shows a high-level block diagram of the transmit path of a near-field transmitter in accordance with the present invention. More particularly, an equalizer receives an input signal and compensates for strip-line loss; an EHF carrier generator, either free-running or locked to a reference extracted from the data input, is coupled to a modulator; and an antenna interface is coupled to the modulator, the antenna interface typically including an impedance matching network and a final output driver coupled to an antenna.

Figure 13:
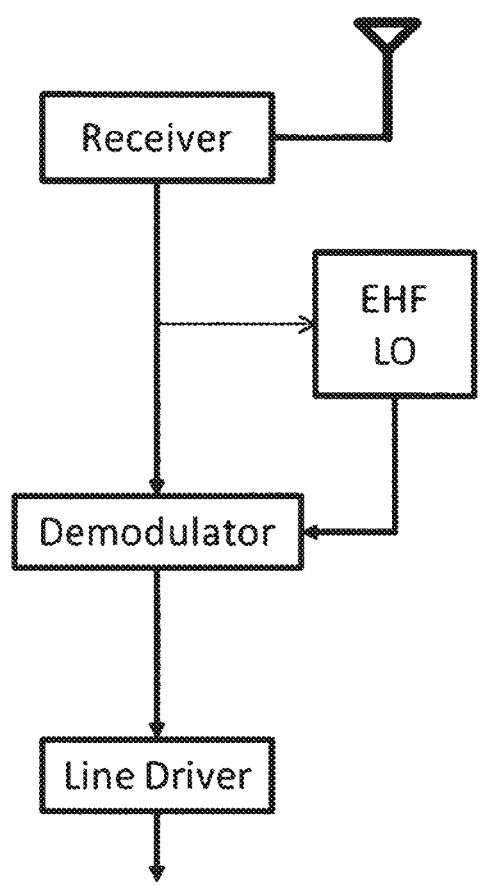
FIG. 13 is a high-level block diagram of the receive path of a near field-receiver in accordance with the present invention.

FIG. 13 shows a high-level block diagram of the receive path of a near-field receiver in accordance with the present invention. More particularly, an antenna is coupled to a receiver that has sufficient sensitivity and signal-to-noise ratio to maintain an acceptable bit-error-rate; the receiver is coupled to an EHF local oscillator and to a demodulator. The demodulator is coupled to a line-driver that provides equalization appropriate for the desired data rate.

Embodiments of the present invention using tightly-coupled near-field communication-link connector-replacement chips are differentiated from typical embodiments of contactless connectors as that term is commonly understood. Contactless connectors are generally adaptations of capacitors or inductors that still require precise mechanical positioning, and use frequency reactive elements that create a non-uniform frequency response. On the other hand, embodiments of the present invention use a modulation scheme to immunize against parasitic effects and resonances. Various embodiments of the present invention include, but are not limited to, electronic products, electronic systems, and connector-replacement means.

One illustrative embodiment in accordance with the present invention includes a first substrate with a first conduction path disposed thereon; a second substrate with a second conduction path disposed thereon; a first near-field transmitter connected to the first conduction path; and a first near-field receiver connected to the second conduction path; wherein the first substrate and the second substrate are spaced apart relative to each other such that the transmitter and receiver are disposed within a distance from each other such that near-field coupling between the first near-field transmitter and the first near-field receiver at the transmitter carrier frequency is obtained. In another aspect of this illustrative embodiment, the transmitter carrier frequency is in the EHF range. In another aspect of this illustrative embodiment, the first near-field transmitter is formed, at least partially, in a first integrated circuit; and the first near-field receiver is formed at least partially, in a second integrated circuit. In some embodiments, the first near-field transmitter includes an antenna disposed within the first integrated circuit. In other embodiments, the first near-field transmitter includes an antenna disposed on the first substrate and coupled to the first integrated circuit. In some embodiments, the first substrate and the second substrate are spaced apart relative to each other such that the first near-field transmitter and the first near-field receiver are disposed within a near-field coupling distance of each other at the first transmitter carrier frequency, the first transmitter carrier frequency is in the EHF range, the first near-field transmitter is operable to translate a data signal from the first conduction path to a modulated carrier and the first near-field receiver is operable to translate the modulated carrier to a baseband signal on the second conduction path.

An illustrative embodiment includes a first printed circuit board with a first wire segment disposed thereon; a second printed circuit board with a second wire segment disposed thereon; a first near-field transceiver mounted on the first printed circuit board such that it is spaced inwardly of a first peripheral edge thereof by a first predetermined amount and in electrical contact with at least the first wire segment; a second near-field transceiver mounted on the second printed circuit board such that it is spaced inwardly of a first peripheral edge thereof by a second predetermined amount and in electrical contact with at least the second wire segment; wherein the first printed circuit board is positioned with respect to the second printed circuit board such that the first peripheral edge of the first printed circuit board is spaced in close proximity to the first peripheral edge of the second printed circuit board. In one aspect of this embodiment, the first transceiver and the second transceiver are disposed within a distance of each other such that, at wavelengths of the EHF carrier frequency, near-field coupling is obtained. It will be appreciated that in alternative embodiments, any substrate suitable for mounting a near-field transmitter, receiver, or transceiver (near-field devices) may be used. Examples of suitable substrates for mounting and operation of the aforementioned near-field devices include, but are not limited to, flexible substrates, rigid substrates, multi-layer substrates, ceramic substrates, FR4, and cable ends. It will be further appreciated that the location on a substrate where a near-field device is mounted is not limited to the peripheral regions of a substrate (e.g., an edge of a printed circuit board), as long as the spacing requirements for near-field operation between a transmitter/receiver pair are met. In some embodiments, one or more of the near-field devices may be embedded in a material such as, but not limited to, molded plastic packaging, of even embedded within a substrate material. Data aggregation and serializer circuitry coupled to the first near-field transceiver, and de-serializer circuitry coupled to the second near-field transmitter.

Another illustrative embodiment includes a line card with a first wire segment disposed thereon; a backplane with a second wire segment disposed thereon; a first near-field transceiver mounted on the line card such that it is spaced inwardly of a first peripheral edge thereof by a first predetermined amount; and a second near-field transceiver mounted on the backplane; wherein the line card is positioned with respect to the backplane such that the first peripheral edge of the line card is spaced in close proximity to the second transceiver. In one aspect of this embodiment, the first transceiver and the second transceiver are disposed within a distance of each other such that, at wavelengths of the EHF carrier frequency, near-field coupling is obtained.

It will be appreciated that various embodiments may include a plurality of discontiguous signal paths and that these discontiguous signal paths may be coupled by a corresponding plurality of near-field transmitter/receiver pairs, each pair disposed within a distance of each other such that, at wavelengths of the EHF carrier frequency, near-field coupling is obtained.

It is noted that the above-mentioned near-field transmitter, receivers, and transceivers, used as connector-replacement chips, may each be implemented as an integrated circuit. It is further noted that additional circuitry may be incorporated into such near-field transceiver connector-replacement chips so as to implement other functions desired for any particular implementation, including, but not limited to aggregation of lower rate signals into a single high-rate carrier. In such an embodiment, two or more different signal paths are coupled to input terminals of a chip having at least a near-field transmitter function, and the information from these two or more different signal paths are combined to produce a single outgoing modulated carrier from which the information of the two or more different signal paths may be obtained. Similarly, a chip having at least the near-field receiver function, receives the modulated signal, demodulates and obtains the information of the two different signal paths and couples those two data streams to different output terminals thereof. Data aggregation and serializer circuitry are coupled to a first one of a pair of near-field transceivers, and de-serializer circuitry is coupled to the second one of a pair of near-field transceivers.

In some alternative embodiments, the transmitter and receiver are disposed on the same substrate such that, in operation, the antennas of the transmitter/receiver pair are separated by a distance such that, at wavelengths of the transmitter carrier frequency, near-field coupling is obtained.

In some alternative embodiments, a near-field transmitter may be counted, or connected, to a wire, without the need for substrate. Similarly, a near-field receiver may be mounted, or connected, to a wire, without the need for a substrate. It is noted that in forming a near-field transmitter/receiver pair, either one of both of the near-field transmitter and receiver may be mounted to a wire. In some embodiments, the near-field devices (i.e., transmitters, receivers, and/or transceivers) are mounted, or connected, to an end portion of the wire. It will be appreciated that such near-field devices may be mounted, or connected, to a flexible substrate.

CONCLUSION

The exemplary methods and apparatus illustrated and described herein find application in at least the field of electronic systems. It is to be understood that the present invention is not limited to the embodiments described above, but encompasses any and all embodiments within the scope of the subjoined claims and their equivalents.

What is claimed is:

1. A system comprising:
a first substrate defining a first plane;
a first communication chip disposed on the first substrate and comprising:
a plurality of input terminals comprising at least a first input terminal and a second input terminal,
a data aggregation circuit configured to receive a first signal from the first input terminal and a second signal from the second input terminal, and configured to combine the first and second signals to generate an aggregated signal, and
a first near-field transmitter configured to receive the aggregated signal from the data aggregation circuit and to transmit the aggregated signal at a first transmit carrier frequency in the extremely high frequency (EHF) range;
a second communication chip disposed on the first substrate, the second communication chip adjacent to the first communication chip and comprising a first near-field receiver configured to receive a transmitted signal at the first carrier frequency from a second near-field transmitter different from the first near-field transmitter;
a second substrate defining a second plane; and
a third communication chip disposed on the second substrate and comprising:
a second near-field receiver operable to near-field couple with the first near-field transmitter at the first transmit carrier frequency and to receive the aggregated signal, and
a data de-aggregation circuit configured to receive the aggregated signal from the receiver and to extract the first signal and the second signal from the aggregated signal,
wherein the first substrate and the second substrate are positioned such that the first and second planes are not co-planar, and wherein the first near-field transmitter and the second near-field receiver are disposed within a near-field coupling distance of each other at the first transmitter carrier frequency.

2. The system of claim 1, wherein the aggregated signal is a modulated carrier signal generated by modulating the first and second signals at the first carrier frequency, and wherein the data de-aggregation circuit is configured to demodulate the aggregated signal to obtain the first signal and the second signal.

3. The system of claim 1, wherein the data aggregation circuit comprises a serializer circuit configured to serialize the first signal and the second signal.

4. The system of claim 1, wherein the data de-aggregation circuit comprises a deserializer circuit configured to deserialize the first and second signals from the aggregated signal.

5. The system of claim 1, wherein the data de-aggregation circuit is configured to couple the extracted first signal to a first output terminal of the third communication chip, and to couple the extracted second signal to a second output terminal of the third communication chip.

6. The system of claim 1, wherein the first substrate on which the first communication chip is disposed corresponds to an electronic device, and wherein the second substrate on which the third communication chip is disposed corresponds to a backplane.

7. The system of claim 6, wherein the first communication chip is at an edge of the electronic device that is adjacent to the backplane.

8. The system of claim 6, wherein the electronic device is aligned to the backplane by a rack.

9. The system of claim 1, wherein the first substrate corresponds to an electronic device, and the first communication ship is spaced inwardly from a peripheral edge of the electronic device by a predetermined amount.

10. The system of claim 1, wherein the first communication chip is spaced 2 mm to 5 mm from the third communication chip.

11. The system of claim 1, wherein the first substrate and the second substrate are positioned such that the first plane is oriented at 90 degrees relative to the second plane.

12. The system of claim 1:
wherein the first communication chip is a first transceiver chip comprising the transmitter and an additional receiver coupled to a first antenna, and
wherein the third communication chip is a second transceiver chip comprising the receiver and an additional transmitter coupled to a second antenna.

13. The system of claim 1, wherein at least one of the first input terminal and the second input terminal is configured to receive the first signal or the second signal as a differential signal.

14. The system of claim 1, further comprising:
a fourth communication chip disposed on the second substrate, the fourth communication chip comprising a second near-field transmitter configured to transmit a second signal at the first transmit carrier frequency;
a third substrate; and
a fifth communication chip disposed on the third substrate, the fifth communication chip comprising a third near-field receiver operable to near-field couple with the second near-field transmitter at the first transmit carrier frequency to receive the second signal.

15. The system of claim 1, wherein the first communication chip is spaced inwardly from a peripheral edge of the first substrate by a first amount.

* * * * *